US009214071B2

(12) United States Patent
Hornik et al.

(10) Patent No.: US 9,214,071 B2
(45) Date of Patent: Dec. 15, 2015

(54) GAMING MACHINE HAVING ENHANCED BONUS GAME PLAY SCHEMES

(71) Applicant: WMS Gaming Inc., Waukegan, IL (US)

(72) Inventors: Jeremy M. Hornik, Chicago, IL (US); Dion K. Aoki, Chicago, IL (US); Joel R. Jaffe, Glenview, IL (US); James J. Poole, Buckinghamshire (GB); Allon G. Englman, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 78 days.

(21) Appl. No.: 13/925,079

(22) Filed: Jun. 24, 2013

(65) Prior Publication Data

US 2013/0288782 A1 Oct. 31, 2013

Related U.S. Application Data

(63) Continuation of application No. 11/125,369, filed on May 9, 2005, now Pat. No. 8,535,143, which is a continuation-in-part of application No. 10/832,564, filed on Apr. 27, 2004, now Pat. No. 7,618,319, which is a continuation-in-part of application No. 10/428,516, filed on May 1, 2003, now abandoned.

(51) Int. Cl.
*A63F 13/00* (2014.01)
*G07F 17/32* (2006.01)

(52) U.S. Cl.
CPC ............ *G07F 17/3267* (2013.01); *G07F 17/32* (2013.01)

(58) Field of Classification Search
CPC ... G07F 17/32; G07F 17/326; G07F 17/3262; G07F 17/3265; G07F 17/3267
USPC ............................................. 463/20, 21, 25
See application file for complete search history.

(56) References Cited

U.S. PATENT DOCUMENTS 5,632,485 A 5/1997 Woodland et al.
5,720,662 A 2/1998 Holmes, Jr. et al.
(Continued)

FOREIGN PATENT DOCUMENTS

JP 2000-271266 A 10/2000
JP 2001-162046 A 6/2001
(Continued)

OTHER PUBLICATIONS

WMS Gaming Inc., "Big Bang Piggy Bankin™", Product Sheet, (1997), (undated), 2 pages.
(Continued)

*Primary Examiner* — Allen Chan
(74) *Attorney, Agent, or Firm* — Nixon Peabody LLP

(57) ABSTRACT

A gaming machine has a wager-input device for receiving a first wager from a player to play a wagering game having a basic game and a bonus game. A display displays a plurality of symbols located thereon during the basic game. The symbols indicate a randomly-selected outcome selected from a plurality of outcomes in response to the wager. The plurality of outcomes includes a bonus-triggering outcome. A set of available game-enhancement parameters is displayed and the player is provided an option of submitting a second wager to purchase at least one of the set of available game-enhancement parameters. The set of available game-enhancement parameters provides an enhancement selected from the group consisting of: additional bonus-triggering outcomes providing a higher probability of triggering the bonus game, and enhanced awards during the bonus game.

20 Claims, 29 Drawing Sheets

(56) References Cited

U.S. PATENT DOCUMENTS

| | | | |
|---|---|---|---|
| 5,851,148 | A | 12/1998 | Brune et al. |
| 5,993,316 | A | 11/1999 | Coyle et al. |
| 6,056,642 | A | 5/2000 | Bennett |
| 6,059,289 | A | 5/2000 | Vancura |
| 6,068,552 | A | 5/2000 | Walker et al. |
| 6,089,977 | A | 7/2000 | Bennett |
| 6,110,041 | A | 8/2000 | Walker et al. |
| 6,120,378 | A | 9/2000 | Moody et al. |
| 6,155,925 | A | 12/2000 | Giobbi et al. |
| 6,159,095 | A | 12/2000 | Frohm et al. |
| 6,179,711 | B1 | 1/2001 | Yoseloff |
| 6,190,255 | B1 | 2/2001 | Thomas et al. |
| 6,203,429 | B1 | 3/2001 | Demar et al. |
| 6,210,277 | B1 | 4/2001 | Stefan |
| 6,227,969 | B1 | 5/2001 | Yoseloff |
| 6,237,916 | B1 | 5/2001 | Webb |
| 6,251,013 | B1 | 6/2001 | Bennett |
| 6,254,481 | B1 | 7/2001 | Jaffe |
| 6,261,178 | B1 | 7/2001 | Bennett |
| 6,267,669 | B1 | 7/2001 | Luciano et al. |
| 6,270,411 | B1 | 8/2001 | Gura et al. |
| 6,290,600 | B1 | 9/2001 | Glasson |
| 6,350,199 | B1 | 2/2002 | Williams et al. |
| 6,386,975 | B1 | 5/2002 | Peterson |
| 6,419,579 | B1 | 7/2002 | Bennett |
| 6,506,116 | B1 | 1/2003 | Sunaga et al. |
| 6,517,433 | B2 | 2/2003 | Loose et al. |
| 6,520,856 | B1 | 2/2003 | Walker et al. |
| 6,561,904 | B2 | 5/2003 | Locke et al. |
| 6,746,328 | B2 | 6/2004 | Cannon et al. |
| 6,793,578 | B2 | 9/2004 | Luccesi et al. |
| 6,869,362 | B2 | 3/2005 | Walker et al. |
| 6,960,133 | B1 | 11/2005 | Marks et al. |
| 7,445,548 | B1 | 11/2008 | Muskin |
| 7,494,415 | B2 | 2/2009 | Nakajima |
| 7,819,737 | B2 | 10/2010 | Englman et al. |
| 7,862,421 | B2 | 1/2011 | Marks et al. |
| 8,002,626 | B2 | 8/2011 | Englman |
| 8,092,299 | B2 | 1/2012 | Cohen et al. |
| 8,328,633 | B2 | 12/2012 | Cohen et al. |
| 8,444,467 | B2 | 5/2013 | Englman et al. |
| 2002/0020965 | A1 | 2/2002 | Potter |
| 2002/0055382 | A1 | 5/2002 | Meyer |
| 2002/0086725 | A1 | 7/2002 | Fasbender et al. |
| 2002/0142825 | A1 | 10/2002 | Lark et al. |
| 2002/0142846 | A1 | 10/2002 | Paulsen |
| 2002/0147047 | A1 | 10/2002 | Letovsky et al. |
| 2002/0155881 | A1 | 10/2002 | Yoshida |
| 2002/0190469 | A1 | 12/2002 | Conklin et al. |
| 2002/0196342 | A1 | 12/2002 | Walker et al. |
| 2003/0013514 | A1 | 1/2003 | Cregan et al. |
| 2003/0027626 | A1 | 2/2003 | Marks et al. |
| 2003/0032476 | A1 | 2/2003 | Walker et al. |
| 2003/0054875 | A1 | 3/2003 | Marks et al. |
| 2003/0060269 | A1 | 3/2003 | Paulsen et al. |
| 2003/0060281 | A1 | 3/2003 | Vancura |
| 2003/0064797 | A1 | 4/2003 | Jackson et al. |
| 2003/0064800 | A1 * | 4/2003 | Jackson et al. .................. 463/30 |
| 2003/0073475 | A1 | 4/2003 | Friedman |
| 2003/0119579 | A1 | 6/2003 | Walker et al. |
| 2003/0162585 | A1 | 8/2003 | Bigelow et al. |
| 2003/0195841 | A1 | 10/2003 | Ginsberg et al. |
| 2003/0216169 | A1 | 11/2003 | Walker et al. |
| 2003/0216170 | A1 | 11/2003 | Walker et al. |
| 2004/0005919 | A1 | 1/2004 | Walker et al. |
| 2004/0053683 | A1 | 3/2004 | Hartl et al. |
| 2004/0092299 | A1 | 5/2004 | Gauselmann |
| 2004/0092300 | A1 | 5/2004 | Gauselmann |
| 2004/0100025 | A1 | 5/2004 | Conklin et al. |
| 2004/0192434 | A1 | 9/2004 | Walker et al. |
| 2004/0204232 | A1 | 10/2004 | Asher et al. |
| 2004/0219968 | A1 | 11/2004 | Fiden et al. |
| 2004/0219969 | A1 | 11/2004 | Casey et al. |
| 2004/0242316 | A1 | 12/2004 | Oles et al. |
| 2004/0266507 | A1 | 12/2004 | Cooper |
| 2005/0054412 | A1 | 3/2005 | Gauselmann |
| 2005/0130731 | A1 | 6/2005 | Englman et al. |
| 2005/0130737 | A1 | 6/2005 | Englman et al. |
| 2005/0192073 | A1 | 9/2005 | Nakajima |
| 2006/0211484 | A1 | 9/2006 | Hornik et al. |
| 2009/0104969 | A1 | 4/2009 | Paulsen et al. |
| 2012/0115594 | A1 | 5/2012 | Hornik et al. |
| 2013/0252708 | A1 | 9/2013 | Englman et al. |

FOREIGN PATENT DOCUMENTS

| | | |
|---|---|---|
| JP | 2003-507151 A | 2/2003 |
| WO | 97/19736 | 6/1997 |
| WO | 00/32286 | 6/2000 |
| WO | 01/15055 | 3/2001 |
| WO | WO 0115055 A1 * | 3/2001 |
| WO | 01/33478 | 5/2001 |
| WO | 02/054331 | 7/2002 |
| WO | 03/089084 | 10/2003 |

OTHER PUBLICATIONS

WMS Gaming Inc., "Stroke of Luck™", Product Sheet, (undated), 2 pages.
WMS Gaming Inc., "Top Cat™", Product Sheet, (undated), 2 pages.
WMS Gaming Inc., "Winning Streak™", Product Sheet, (undated), 2 pages.
European Search Report mailed Jul. 12, 2005 which issued in corresponding European Patent Application No. 04010312.9 (3 pages).

* cited by examiner

GAMING MACHINE HAVING ENHANCED BONUS GAME PLAY SCHEMES

CLAIM OF PRIORITY AND CROSS-REFERENCE TO RELATED APPLICATIONS

This application is a continuation of U.S. patent application Ser. No. 11/125,369, which was filed on May 9, 2005, as a continuation-in-part application of U.S. patent application Ser. No. 10/832,564, now U.S. Pat. No. 7,618,319, which was filed on Apr. 27, 2004, as a continuation-in-part application of U.S. patent application Ser. No. 10/428,516, which was filed May 1, 2003, and is now abandoned, all of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to gaming machines, and methods for playing wagering games, and more particularly, to a gaming machine having an enhanced game play scheme providing enhanced bonus game play or bonus game play that is easier to achieve in exchange for a side-bet.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting of the machines. Shrewd operators consequently strive to employ the most entertaining and exciting machines available because such machines attract frequent and extended play and hence increase profitability to the operator. Accordingly, in the competitive gaming machine industry, there is a continuing need for gaming machine manufacturers to produce new types of games, or enhancements to existing games, which will attract frequent and extended play by enhancing the entertainment value and excitement associated with the game.

U.S. Patent Application Publication No. US 2003/0064800 A1, to Jackson et al. ("Jackson et al."), notes that games displayed by video gaming machines are becoming increasingly complex. In an effort to provide a video gaming machine that is more easily understood by a player and yet provides all the features and excitement as any modem gaming machine, Jackson et al. proposes a video gaming machine with pop-up windows. Touching various icons on a touch screen video display, such as the symbols on simulated reels, pay line identifiers, and other icons, causes an associated pop-up window or other overlay to be generated. The overlay highlights or explains the selected feature. Jackson et al. asserts that such overlays reduce clutter on the display, can be graphically intensive to avoid the use of text, can be easily understood, can be quickly and logically accessed, and may even include animation. Jackson et al., however, is generally limited to the passive use of overlays for obtaining information about a selected feature so that the selected feature can be understood by the player.

Another U.S. patent application Ser. No. 10/731,941 to Englman et al., entitled "Gaming Machine Having An Enhanced Game Play Scheme", discloses a gaming machine, where in response to receipt of a second wager to select an option for enhanced game play, a player is provided with enhanced game play. Enhanced game play includes enhancing an existing aspect of the wagering base game. The option is for enhanced game play is preferably offered only to a player who has placed a maximum bet for the game (e.g., the player has selected the maximum number of pay lines and the maximum allowable credits per pay line). The gaming machine can be configured with either a video main display or an electromechanical main display (e.g., electromechanical spinning reels) with superimposed video images thereon provided by a flat panel transmissive display positioned in front of the electromechanical main display.

Gaming machines in the art have bonus games that player plays upon achieving a certain outcome in a basic game. However, achieving the requisite outcome to earn bonus game play is typically very difficult and the player can experience a stretch of game play during which no bonus game play is awarded. Consequently, the player may lose interest in playing on such machines. Also, even if the player is awarded bonus game play, the potential payouts are not large enough to maintain the player's enthusiasm for those particular gaming machines. Aspects of the present disclosure are directed toward satisfying this and other needs.

SUMMARY

A gaming machine with interactive pop-up windows providing enhanced game play schemes, including side-bet schemes, is described herein. Placing a side-bet utilizing interactive pop-up windows enables the player to make an additional wager to "purchase" one of any number of game enhancements, or to "side-bet" that the game outcome will include a particular symbol or symbol combination, depending on the side-bet scheme enabled for a particular gaming machine. In an embodiment, the player has an option to select one or more side-bet(s) via a pop-up window(s) prior to game play initiation. In another embodiment, the player has an option to select one or more side-bet(s) via a pop-up window (s) after a partial game outcome is displayed.

Another aspect of the disclosure is directed to a gaming machine having a wager-input device for receiving a first wager from a player to play a wagering game having a basic game and a bonus game. A display displays a plurality of symbols located thereon during the basic game. The symbols indicate a randomly-selected outcome selected from a plurality of outcomes in response to the wager. The plurality of outcomes includes a bonus-triggering outcome. A set of available game-enhancement parameters is displayed and the player is provided an option of submitting a second wager to purchase at least one of the set of available game-enhancement parameters. The set of available game-enhancement parameters provides an enhancement selected from the group consisting of: additional bonus-triggering outcomes providing a higher probability of triggering the bonus game, and enhanced awards during the bonus game.

An additional aspect of the disclosure is directed to a method of conducting a wagering game on a gaming machine. A first wager is received from a player to play the wagering game. The wagering game has a basic game and a bonus game. A game outcome is randomly selected from a plurality of outcomes in response to the wager. The plurality of outcomes includes a bonus-triggering outcome. A set of available game-enhancement parameters is displayed and an option of submitting a second wager is provided to purchase at least one of the set of available game-enhancement parameters. The set of available game-enhancement parameters provides at least one of (i) additional bonus-triggering outcomes providing a higher probability of triggering the bonus game, and (ii) enhanced awards during the bonus game. The game outcome for the wagering game is displayed as symbols indicating a randomly selected outcome selected from a plurality of outcomes in response to the wager.

According to yet another aspect of the disclosure, a computer readable storage medium is encoded with instructions for directing a gaming device to perform the above method.

An additional aspect of the invention is directed to a gaming system for playing a wagering game having a basic game and a bonus game. The gaming system has at least one display and a controller coupled to the display and programmed to initiate the wagering game in response to detection of a first wager from a player. The basic game of the wagering game displays symbols indicating a randomly selected game outcome selected from a plurality of outcomes. A set of available game-enhancement parameters are displayed and the player is provided an option of submitting a second wager to purchase at least one of the set of available game-enhancement parameters. The set of available game-enhancement parameters provide at least one of (i) additional bonus-triggering outcomes providing a higher probability of triggering the bonus game, and (ii) enhanced awards during the bonus game. The game outcome is then displayed.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
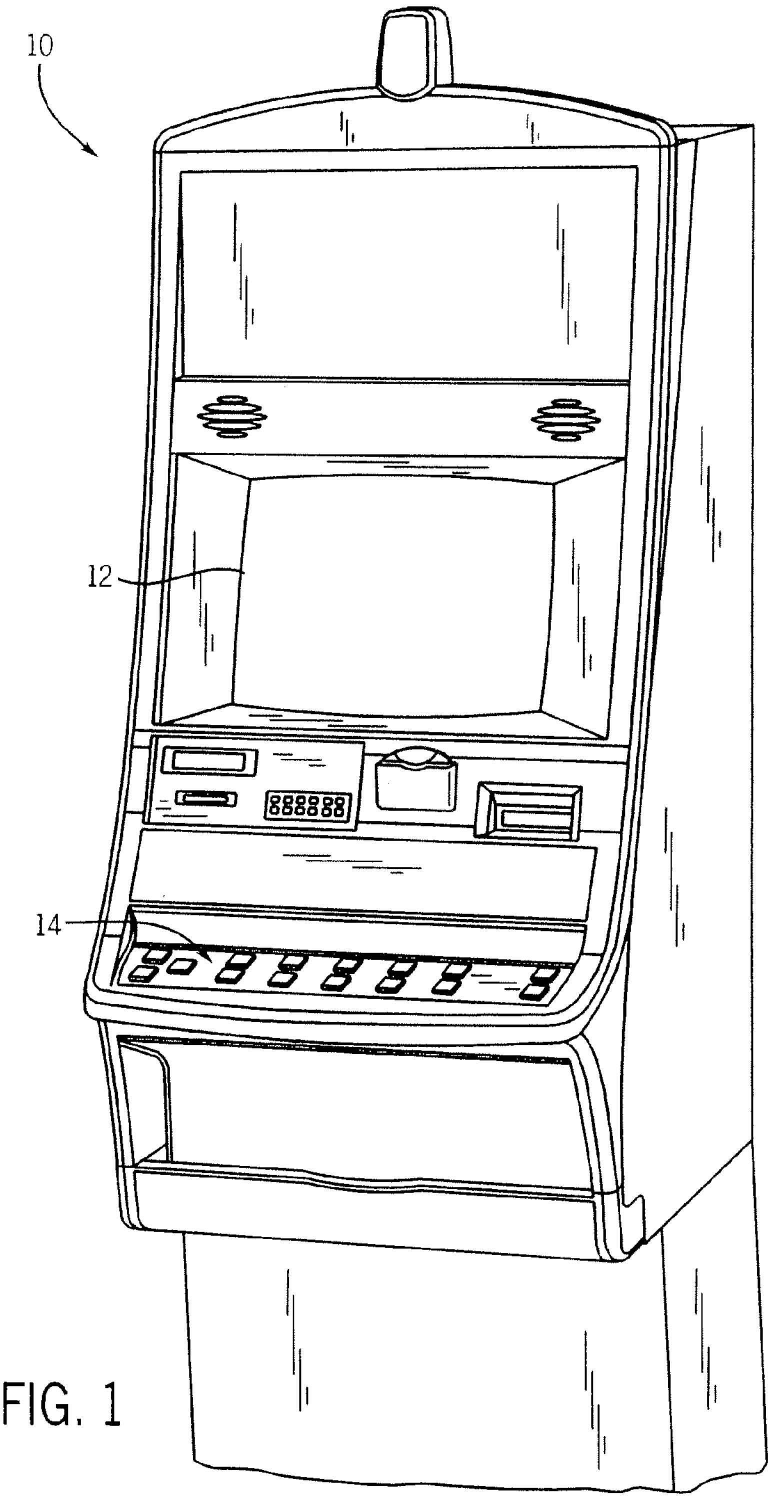
FIG. 1 is a perspective view of a representative video gaming machine.

While the invention is susceptible to various modifications and alternative forms, representative embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF EMBODIMENTS

The description of the specific embodiments is to be construed as exemplary only and does not describe every possible embodiment of the invention. Numerous alternative embodiments could be implemented, using either current technology or technology developed after the filing date of this patent, which would still fall within the scope of the claims defining the invention.

As described below, aspects of the present disclosure are implemented using a video slot machine. It is contemplated that aspects of the present invention may also be implemented using other types of video gaming machines or, in some cases, using an adaptable mechanical spinning reel gaming machine having flat panel transmissive display positioned in front of the mechanical spinning reels. The flat panel transmissive display is adapted to, among other things, superimpose video images upon the mechanical spinning reels. A mechanical spinning reel gaming machine with superimposed video images generated by a flat panel transmissive display is described in U.S. Pat. No. 6,517,433, entitled "Reel Spinning Slot Machine with Superimposed Video Image", naming Loose et al. as inventors, filed May 22, 2001, and herein incorporated by reference in its entirety.

Turning now to the drawings and referring initially to FIG. 1, a video gaming machine 10 is operable to play a video wagering game. The gaming machine 10 includes a video display 12 preferably in the form of a cathode ray tube (CRT), liquid crystal display (LCD), plasma, or other type of video display known in the art. A touch screen panel of the resistive, capacitive, or surface wave type is attached externally to the display 12. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
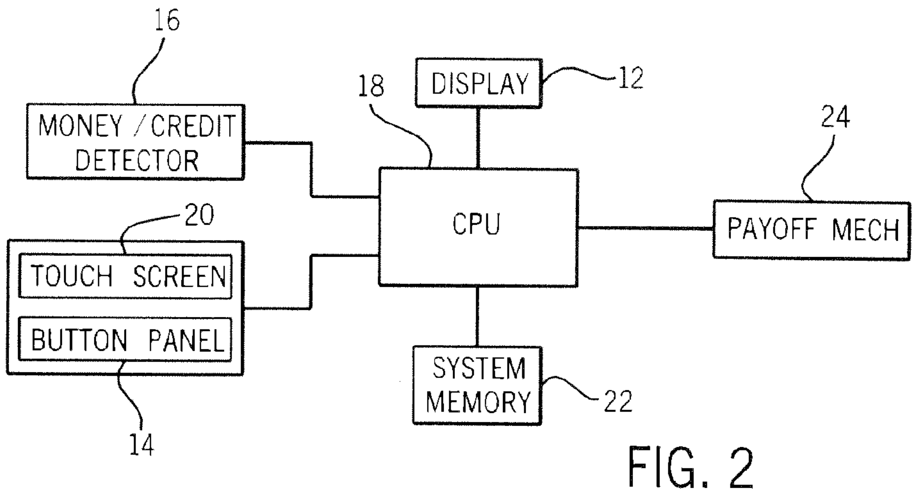
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Using a button panel 14 (see FIG. 1) and/or a touch screen 20, the player may select any variables associated with the wagering game, and place his/her wager to purchase a play of the game. During a play of the game, the CPU 18 generates at least one random event using a random number generator (RNG) and provides an award to the player for a winning outcome of the random event. The CPU 18 operates the display 12 to represent the random event(s) and outcome(s) in a visual form that can be understood by the player. In addition to the CPU 18, the control system may include one or more additional slave control units for operating the display 12.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or bonus events. The payoff may be provided in the form of coins, bills, tickets, coupons, cards, etc. The payoff amounts are determined by one or more pay tables stored in the system memory 22.

The present invention is described below in the context of a video reel slot game. It should, however, be understood that the present invention may be implemented with other video wagering games such as poker, keno, bingo, blackjack, or roulette. The description below first describes the operation of a video reel slot game and then describes how a player can use interactive pop-up windows to configure different aspects of the game.

Figure 3:
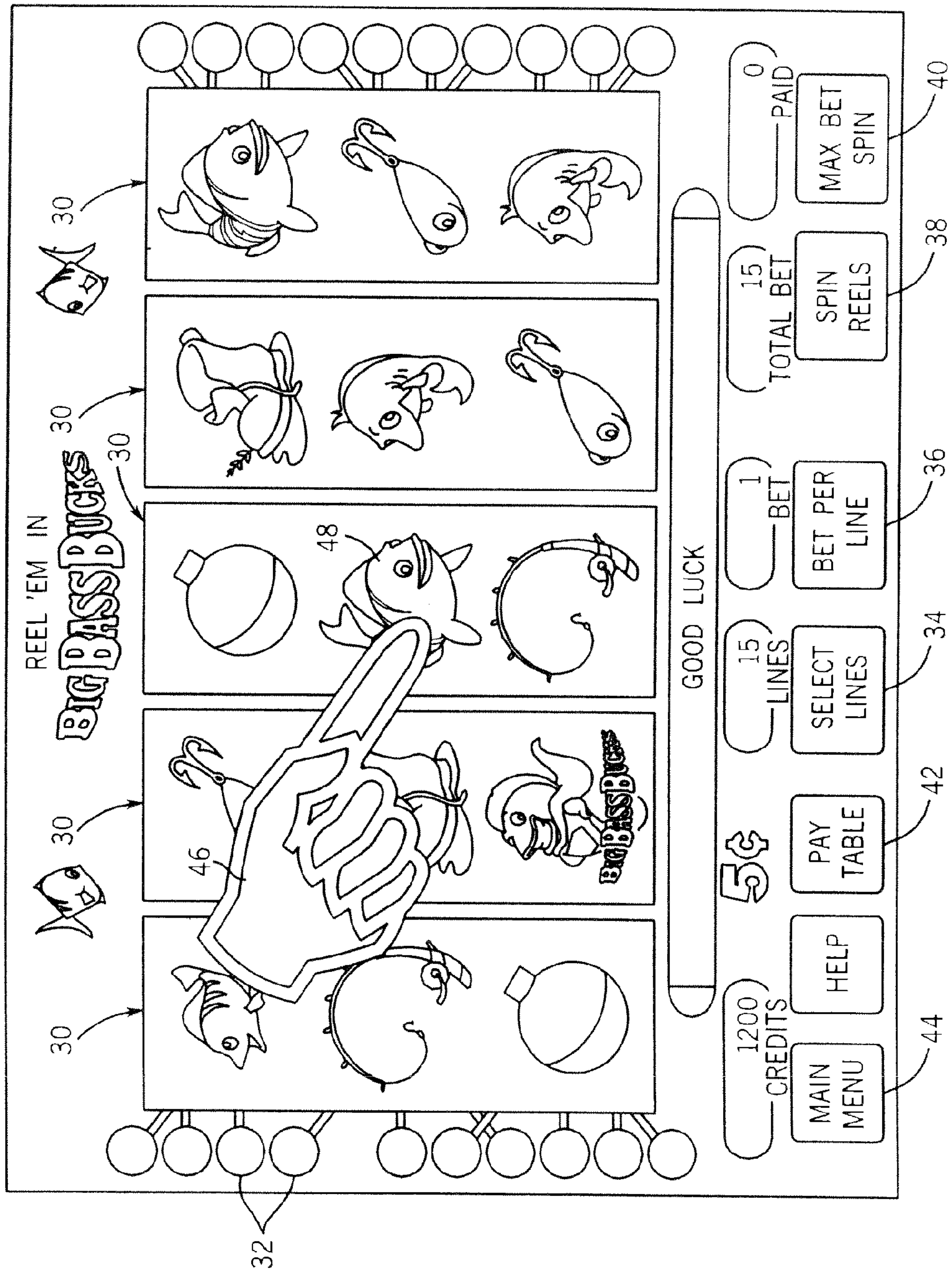
FIGS. 3 through 7 are display images showing the use of a pop-up window to make a side-bet.

The operation of the video reel slot game is described with reference to FIG. 3. Referring to FIG. 3, a basic, or base, video slot game is implemented on the display 12 on simulated reels 30 that are rotated and stopped to place symbols on the reels 30 in visual association with a number of pay lines 32. In the illustrated example, the number of reels 30 is five and the number of pay lines 32 is nine, fifteen, or twenty. The number of reels and pay lines may, however, be varied to include more or less than the number illustrated. Each of the pay lines 32 extends through one symbol on each of the reels 30.

Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 34. The player then chooses the number of coins or credits to wager on the selected pay lines by pressing a "Bet Per Line" key 36. After selecting a number of pay lines and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels in motion.

The CPU uses a random number generator (RNG) to select a game outcome (e.g., a "basic" game outcome) corresponding to a particular set of reel "stop positions." The CPU then causes each of the simulated reels 30 to stop at the appropriate stop position corresponding to the selected game outcome. Video symbols displayed on the reels 30 graphically illustrate the reel stop positions and indicate to the player whether the stop positions of the reels represent a winning game outcome.

A pay table identifies winning basic (or "base") game outcomes (e.g., symbol combinations resulting in an award of credits or a bonus event) and the awards associated with such outcomes. In one embodiment, the pay table is affixed to the machine 10 and/or displayed by the video display 12 in response to a command by the player (e.g., by pressing a "Pay Table" button 42). A winning basic game outcome occurs when the video symbols appearing on the reels 30 along an active pay line correspond to one of the winning symbol combinations displayed on the pay table. A winning symbol combination, for example, could be three or more matching symbols along an active pay line. Typically, the award is greater as the number of matching symbols along the active pay line increases. If the displayed video symbols of the stopped reels 30 align in a winning symbol combination, the game provides the award identified in the pay table for that winning symbol combination. If the award is a number of credits, the game typically multiplies that number of credits by the number of credits wagered on the winning pay line. The player may collect the amount of accumulated credits by pressing a "Collect" button 44. In the illustrated example, the winning symbol combinations start from the leftmost reel and span adjacent reels, i.e., winning line pay combinations pay left to right only. In an alternative implementation, the winning combinations start from either the leftmost reel or the rightmost reel and span adjacent reels, i.e., winning line pay combinations pay left to right and right to left.

Included among the plurality of basic game outcomes are start-feature outcomes for triggering play of different bonus events. The bonus events may, for example, include The Big Bass Bonus and The Fishin' Bonus referenced in FIG. 8 and may include any type of game, either similar to or completely different from the basic video reel slot game. A start-feature outcome may be defined in one of any number of suitable ways. For example, a start-feature outcome may occur when a special start-feature symbol or a special combination of symbols appears on one or more of the reels 30. The start-feature outcome may require the combination of symbols to appear along an active pay line, or may alternatively require that the combination of symbols appear anywhere on the display (i.e., "scattered") regardless of whether the symbols are along an active pay line. The appearance of a start-feature outcome causes the CPU to shift operation from the basic game to the associated bonus event. Upon completion of the bonus event, the CPU shifts operation back to the basic game.

In accordance with the present invention, the player can open interactive pop-up windows by touching different portions of the touch screen video display 12 and can, in turn, configure different aspects of the wagering game via the pop-up windows. Several figures (i.e., FIGS. 3, 4, 5, 8, 9, 10, 11, 13, 14, 15, 17, 18, 24, and 25) depict a hand 46 pointing to a portion of the display image. The hand 46 is not part of the display image, but rather represents the player's physical hand touching a portion of the display image to either open a pop-up window or select an option within a previously opened pop-up window.

Figure 4:
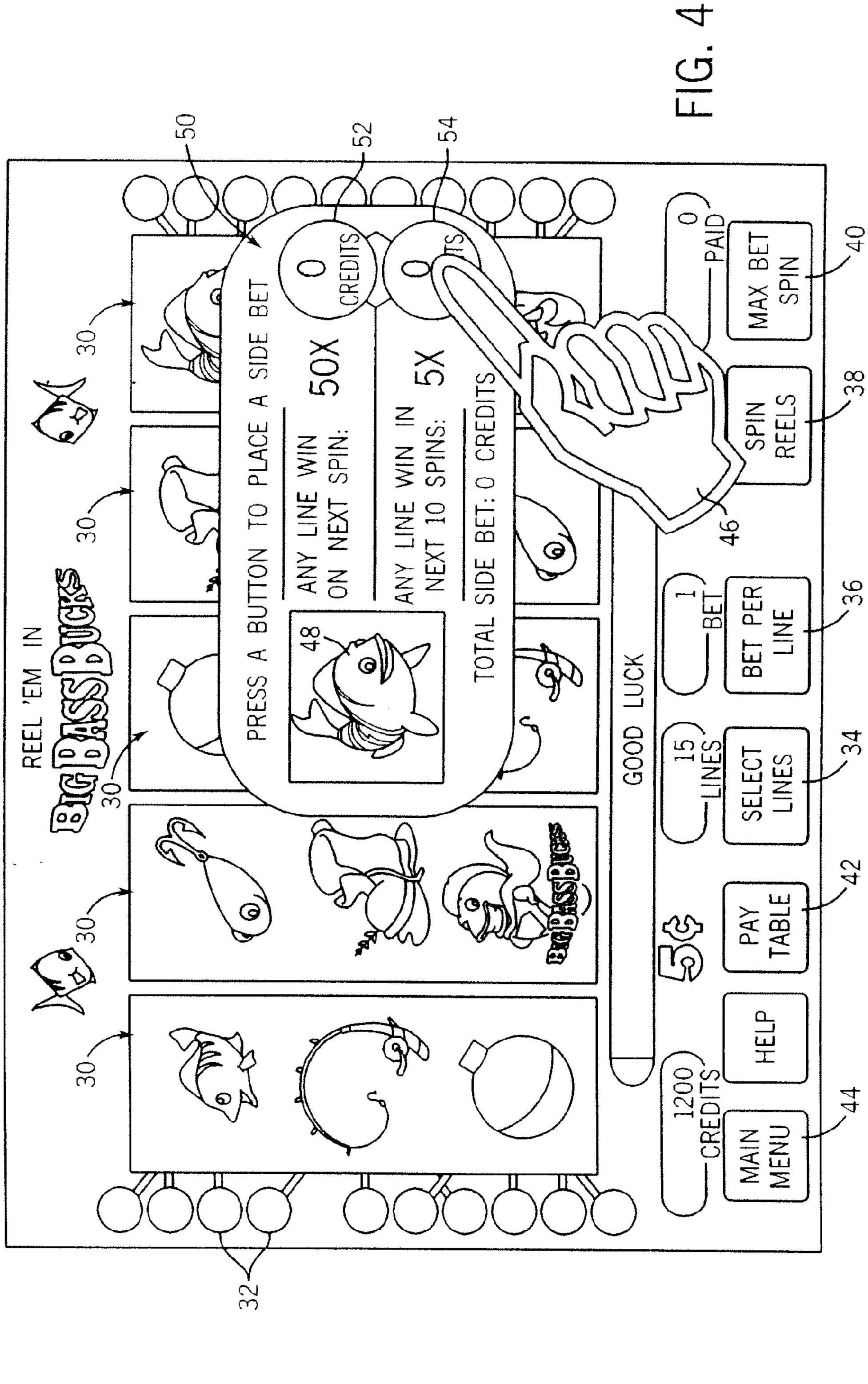
Figure 5:
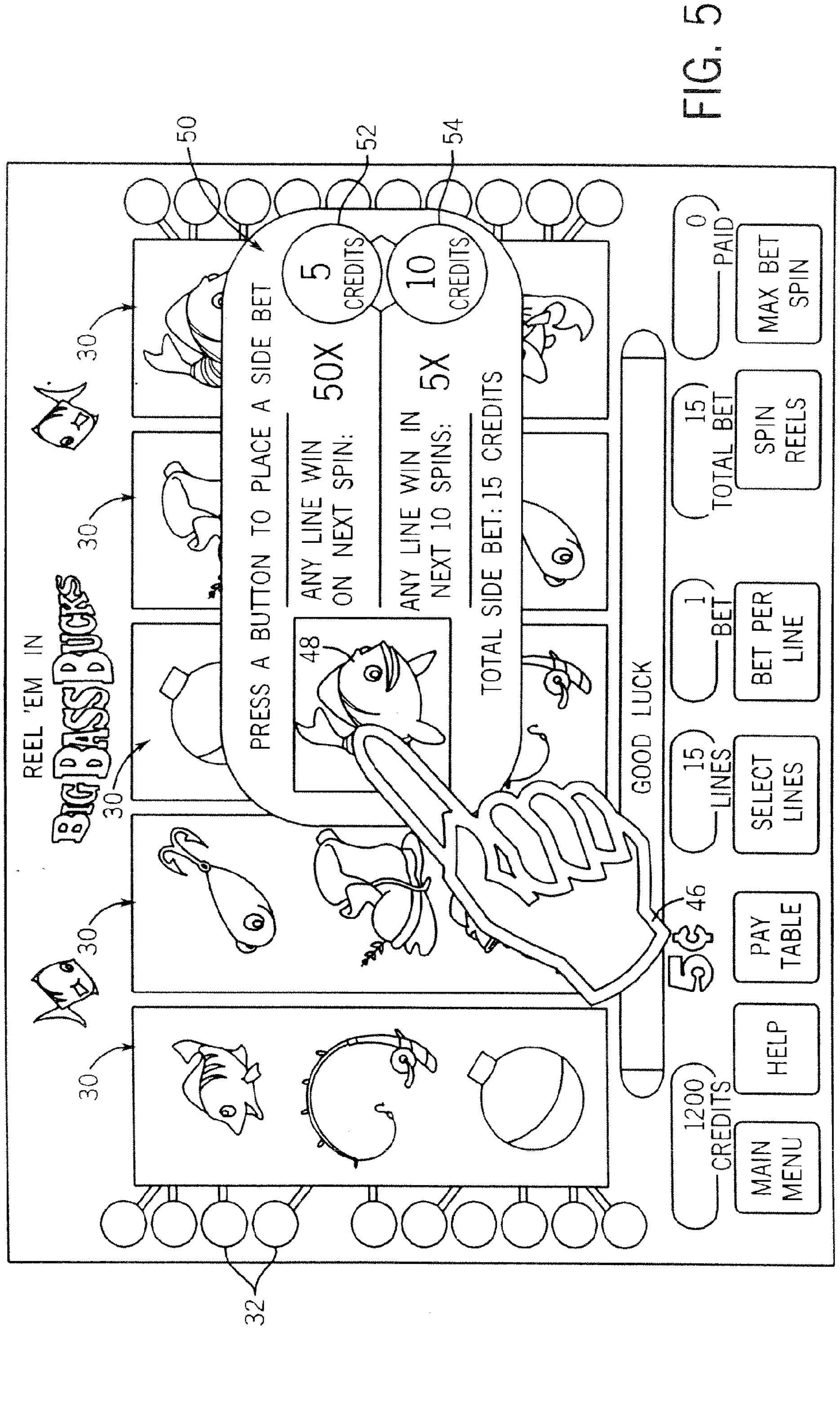
Figure 6:
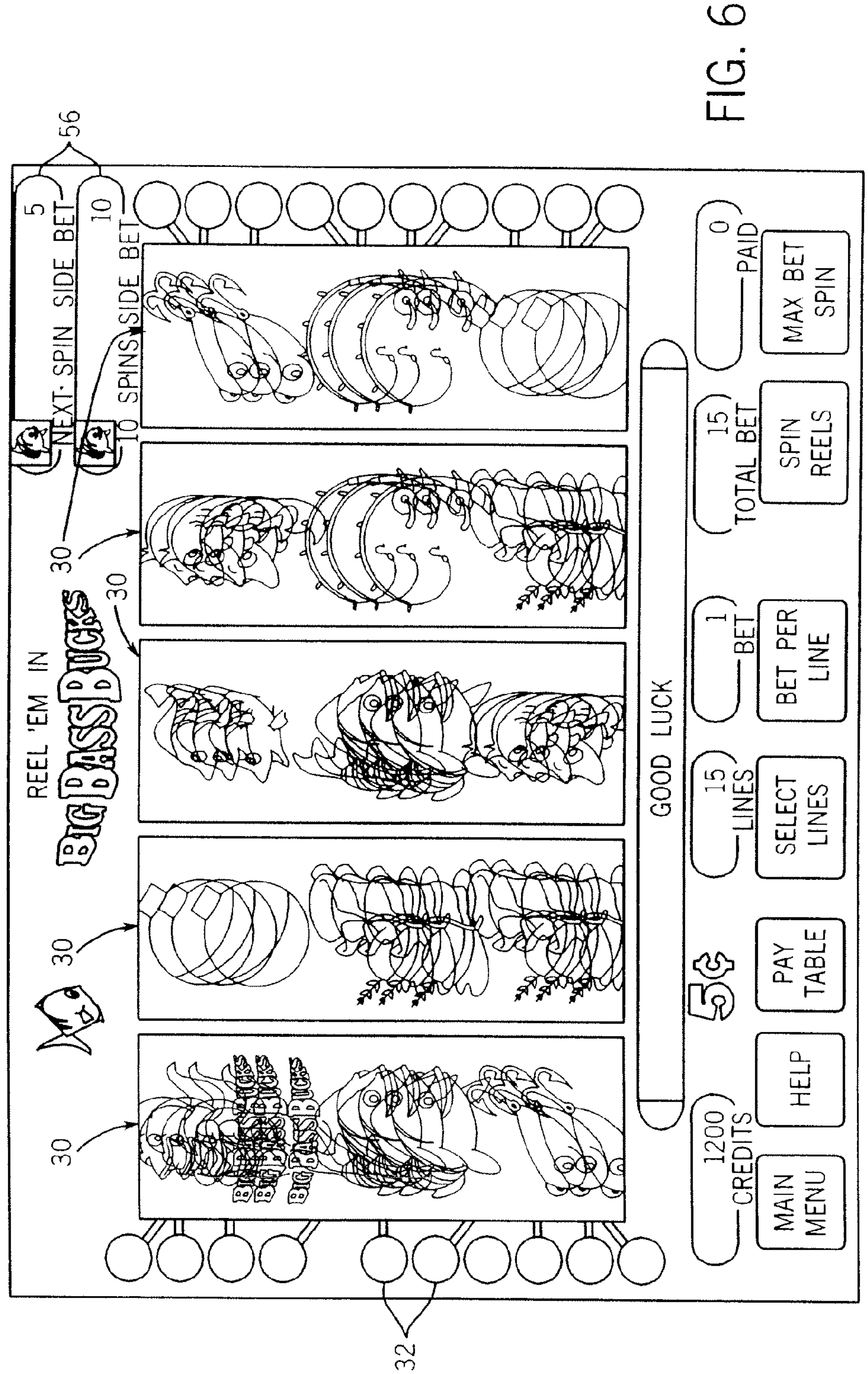
Figure 7:
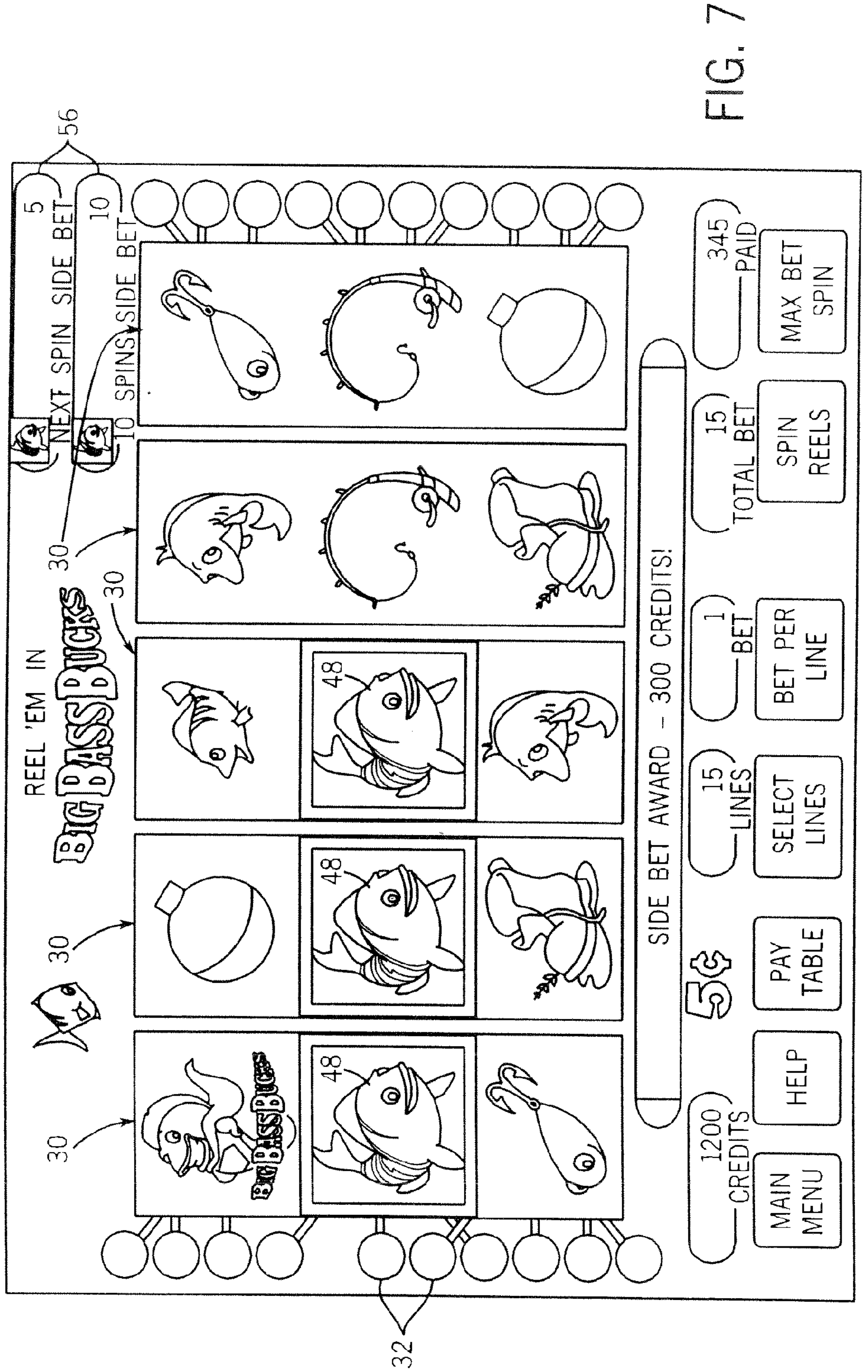

FIGS. 3 through 7 are display images showing the use of a pop-up window to make a side-bet. Before spinning the reels 30, the player can touch any symbol to place a side-bet (FIG. 3). In the illustrated example, the player touches a big fish symbol 48. Touching the big fish symbol 48 opens a pop-up window 50 (FIG. 4). Using the pop-up window 50, the player can then wager that the big fish symbol 48 will yield a line pay either (i) on the next reel spin (which pays the "next spin" side-bet multiplied by 50) by touching an onscreen button 52 or (ii) at any point during the next ten reel spins (which pays the "next 10 spins" side-bet multiplied by 5) by touching an onscreen button 54. In the illustrated example, the player wagered five credits that the big fish symbol 48 will yield a line pay on the next reel spin and ten credits that the big fish symbol 48 will yield a line pay at least once during the next ten reel spins (FIG. 5). When the player has finished placing side-bets, side-bet meters 56 appear on the display to indicate the placed side-bets (FIG. 6). The player may set the reels 30 in motion by touching the "Spin Reels" key 38 or, if the player wishes to bet the maximum amount per line, by touching the "Max Bet Spin" key 40. FIG. 6 depicts the reels 30 in motion. In the illustrated example, the reels 30 stop with three big fish symbols 48 along an active pay line 32 (FIG. 7). Therefore, in addition to a standard payout of 45 credits as determined by a standard pay table for the game, the player is also awarded a side-bet award of 300 credits. The side-bet award includes 250 credits (=5.times.50) for the "next spin" side-bet and 50 credits (=10.times.5) for the "next 10 spins" side-bet.

Figure 8:
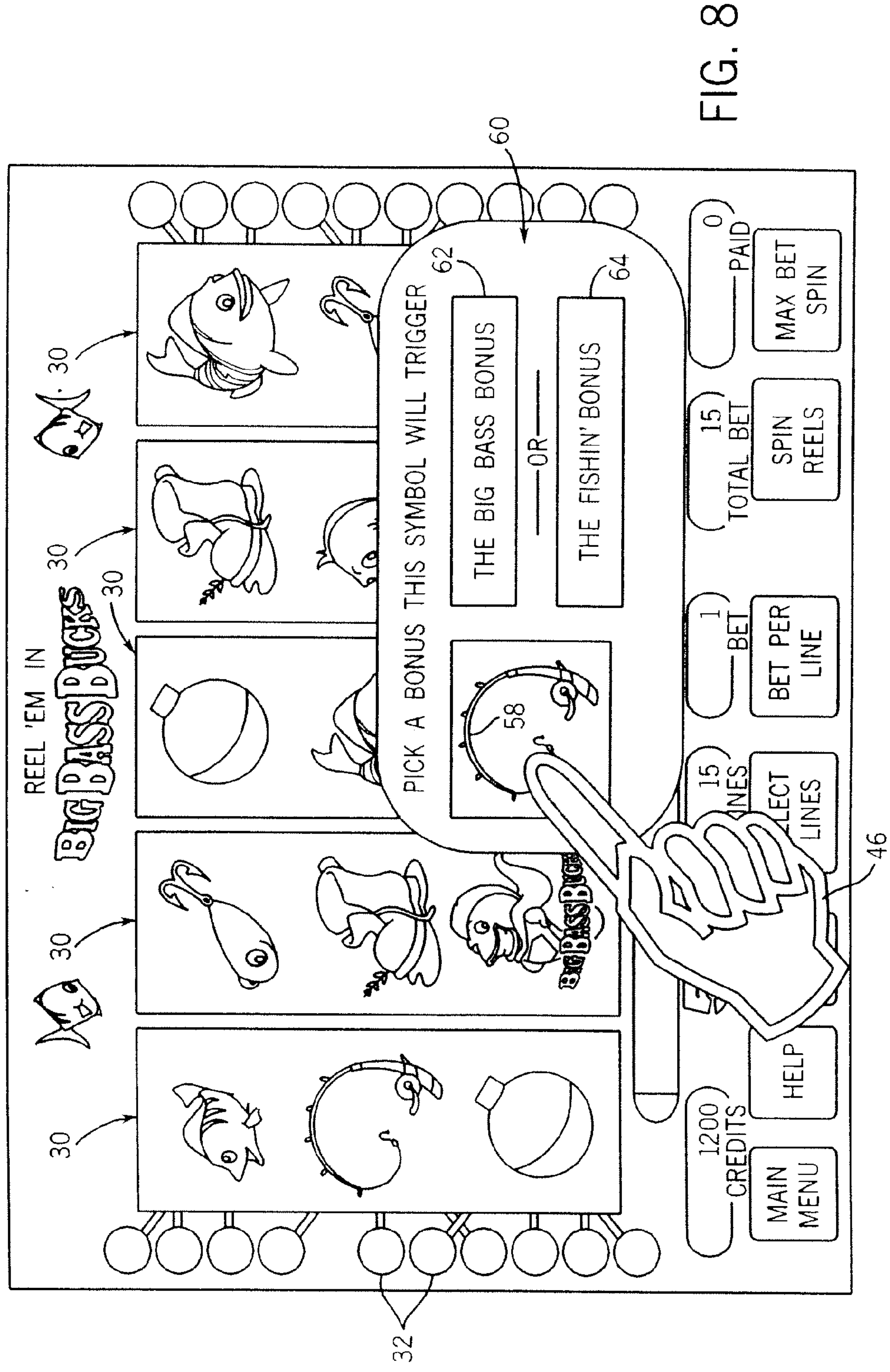
FIG. 8 is a display image showing the use of a pop-up window to select a bonus event to be triggered by a selected symbol.

FIG. 8 is a display image showing the use of a pop-up window to select a bonus event to be triggered by a selected symbol. Before spinning the reels 30, the player can touch any symbol. Alternatively, the player may only be allowed to select certain symbols that are predefined as capable of triggering bonus events. In the illustrated example, the player touches a fishing reel symbol 58. Touching the fishing reel symbol 58 opens a pop-up window 60. Using the pop-up window 60, the player can then select a bonus event (e.g., The Big Bass Bonus or The Fishin' Bonus) to be triggered by the fishing reel symbol 58. In the illustrated example, the player touches an onscreen button 62 to select The Big Bass Bonus or an onscreen button 64 to select The Fishin' Bonus. If the start-feature outcome is, for example, a combination of at least three fishing reel symbols 58 along an active pay line, then the appearance of this combination along an active pay line during the basic reel slot game will trigger the bonus event selected via the pop-up window 60.

Figure 9:
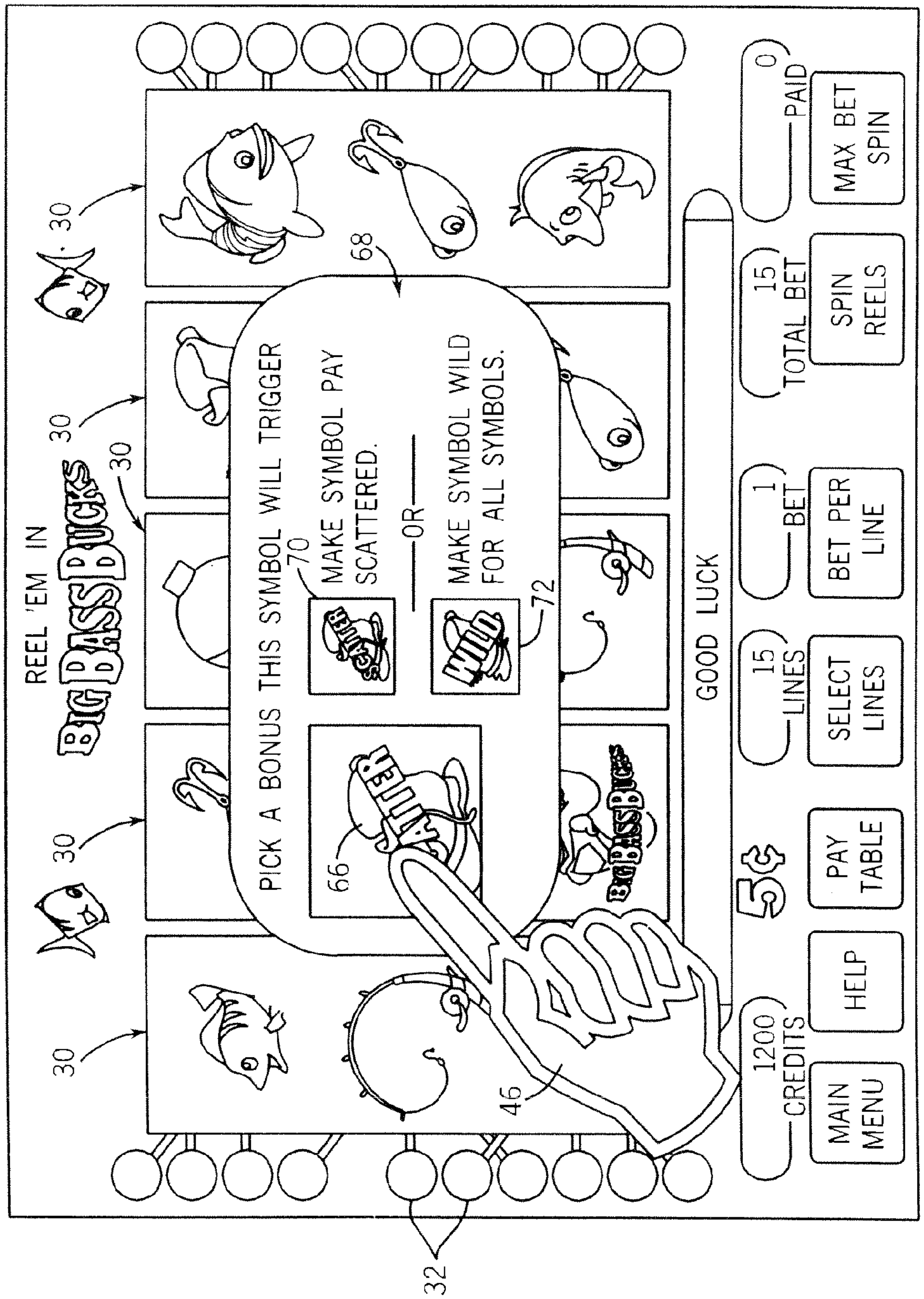
FIG. 9 is a display image showing the use of a pop-up window to select how a selected symbol will be evaluated during a basic reel slot game.

FIG. 9 is a display image showing the use of a pop-up window to select how a selected symbol will be evaluated during the basic reel slot game. A symbol may, for example, be evaluated as a scatter, wild, left-to-right line pay, right-to-left line pay, or a bonus trigger. All, some, or none of these functions may be available for a selected symbol. Before spinning the reels 30, the player can touch any symbol. In the illustrated example, the player touches an old boot symbol 66. Touching the old boot symbol 66 opens a pop-up window 68. Using the pop-up window 68, the player can then select how the old boot symbol 66 will be evaluated (e.g., scatter pay or wild) during the basic reel slot game. In the illustrated example, the player touches an onscreen button 70 to make the old boot symbol 66 pay scattered, i.e., the appearance of a winning combination of old boot symbols 66 on the stopped reels 30 during the basic reel slot game results in an award whether or not the symbols appear along an active pay line 32. The player touches the onscreen button 72 to make the old boot symbol 66 wild (substitute) for other symbols during the basic reel slot game.

Figure 10:
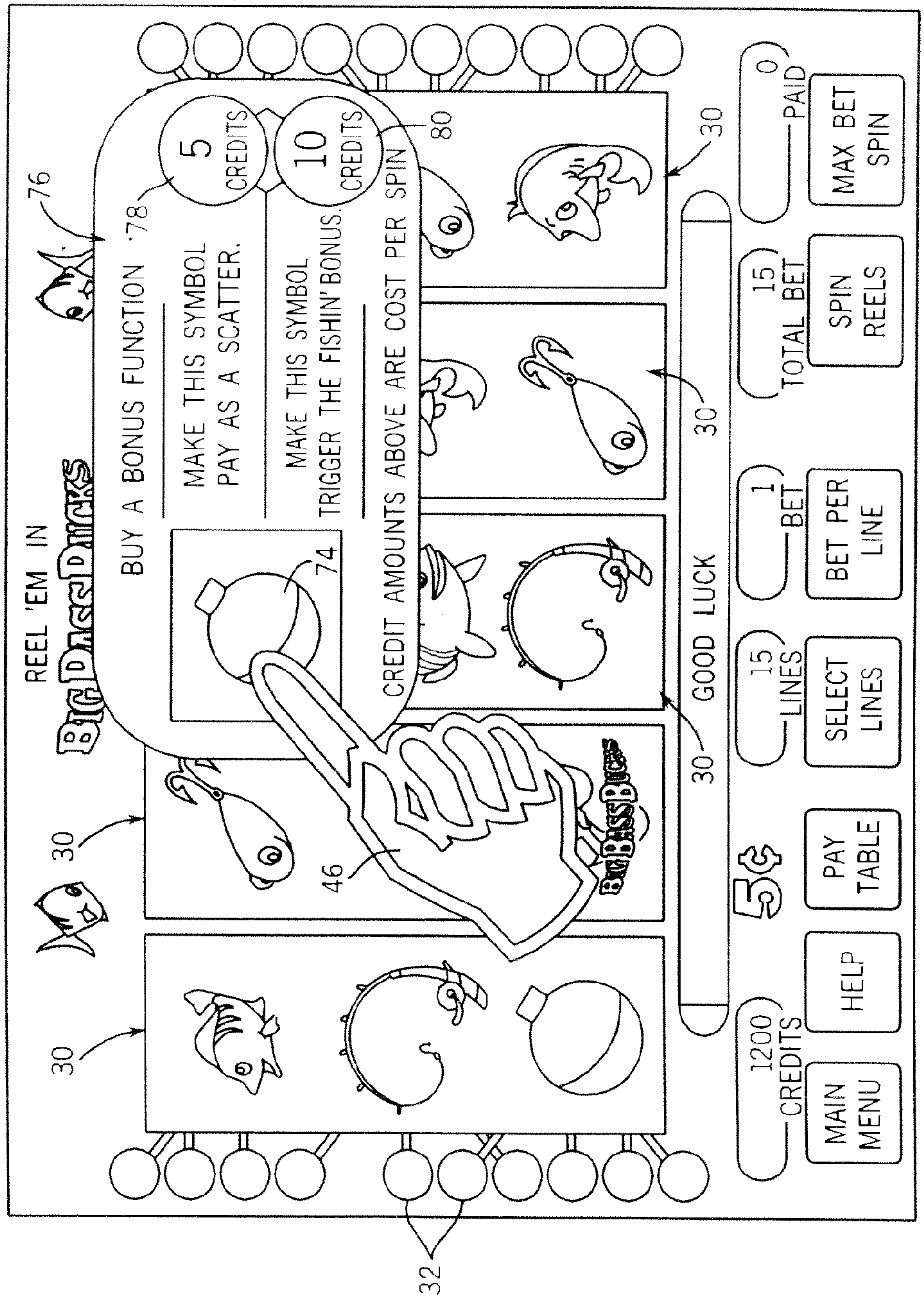
FIG. 10 is a display image showing the use of a pop-up window to purchase a bonus function to be associated with a selected symbol.

FIG. 10 is a display image showing the use of a pop-up window to purchase a bonus function to be associated with a selected symbol. The bonus function is preferably in addition to the standard function for the selected symbol. As described in connection with FIG. 9, possible bonus functions may, for example, include evaluation of the selected symbol as a scatter, wild, left-to-right line pay, right-to-left line pay, or a bonus trigger, or having additional winning combinations on the pay table. All, some, or none of these functions may be available for a selected symbol. Before spinning the reels 30, the player can touch any symbol. In the illustrated example, the player touches a bobber symbol 74. Touching the bobber symbol 74 opens a pop-up window 76. Using the pop-up window 76, the player can then purchase a bonus function (e.g., scatter pay or trigger for The Fishin' Bonus) for the bobber symbol 74. In the illustrated example, the player touches an onscreen button 78 to make the old boot symbol 66 pay as a scatter and the onscreen button 80 to make the old boot symbol 66 operate as a trigger for the Fishin' Bonus. The purchase price for the selected bonus function may be a predetermined number of credits or any number of credits selected by the player. The credit amount may need to be greater than a predetermined minimum (e.g., 5 credits) and, with each press of the applicable button 78 or 80, may increment in predetermined steps. The credit amount may be the cost per spin of the reels 30 as illustrated, or may be the cost for a block of spins of the reels 30. If the selected bonus function occurs during the basic reel slot game, the award for the occurrence of the bonus function is multiplied by the number of credits used to purchase the bonus function.

Figure 11:
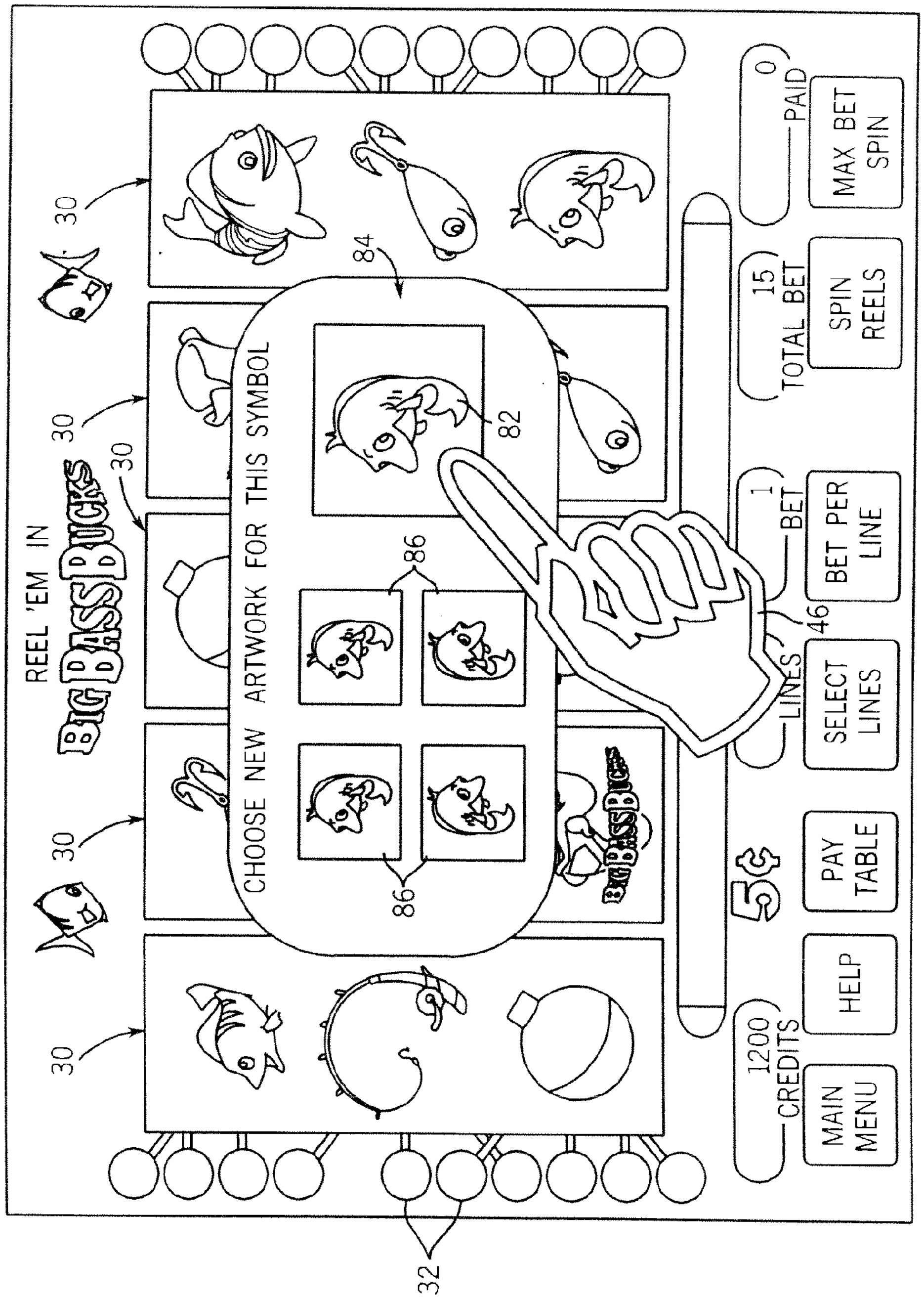
FIG. 11 is a display image showing the use of a pop-up window to select new artwork for a selected symbol.

FIG. 11 is a display image showing the use of a pop-up window to select new artwork for a selected symbol. The new artwork may entail changes to the background, color, shape, orientation, or other graphic attribute of the selected symbol. Before spinning the reels 30, the player can touch any symbol. In the illustrated example, the player touches a medium fish symbol 82. Touching the medium fish symbol 82 opens a pop-up window 84. Using the pop-up window 84, the player can then select new artwork for the medium fish symbol 82 from a plurality of possible artwork schemes denoted by respective onscreen buttons 86. The player selects one of the artwork schemes 86 by touching it.

Figure 12:
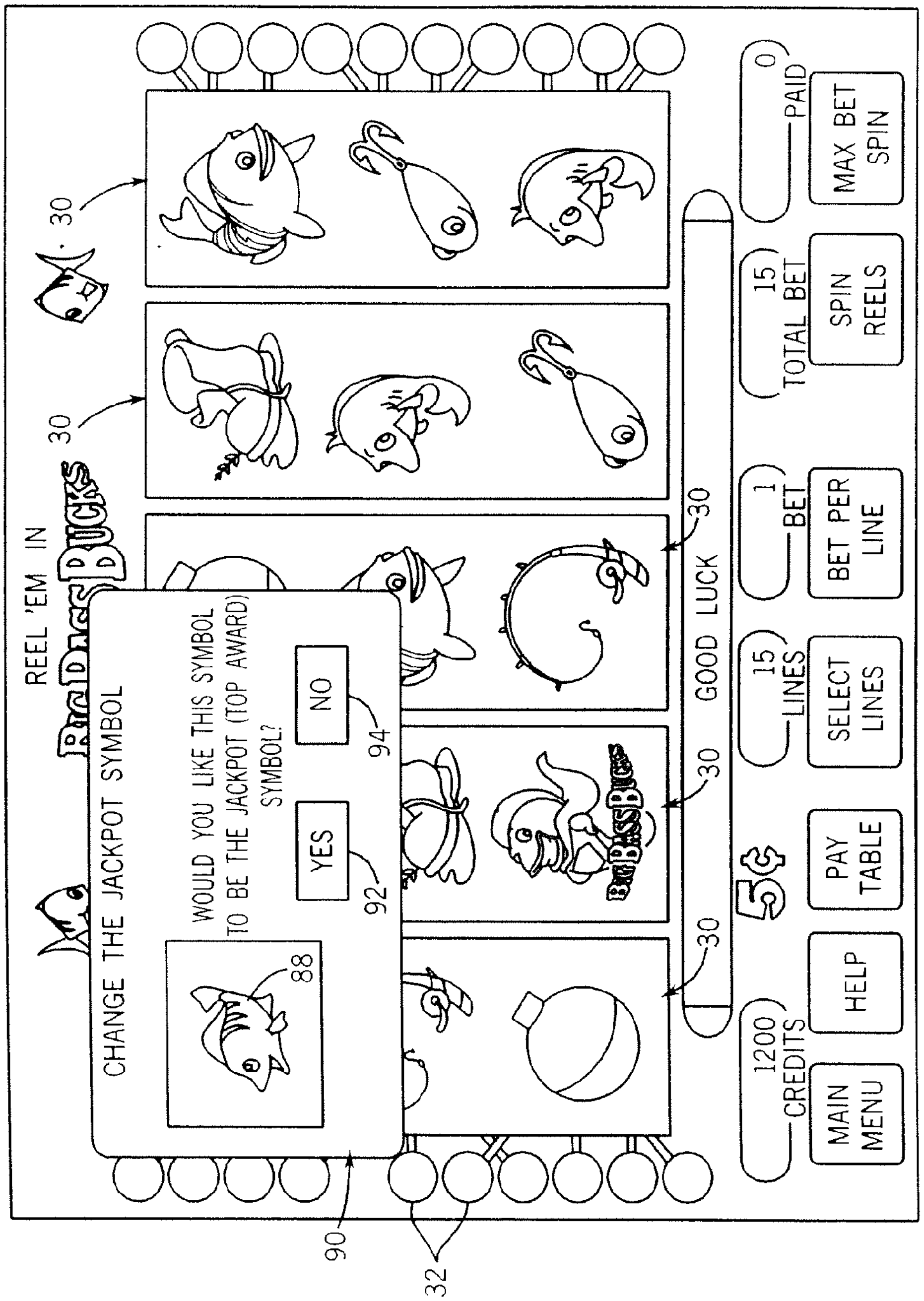
FIG. 12 is a display image showing the use of a pop-up window to change a selected symbol's position in a pay hierarchy, e.g., changing the selected symbol to the jackpot (top award) symbol.

FIG. 12 is a display image showing the use of a pop-up window to change a selected symbol's position in a pay hierarchy, e.g., changing the selected symbol to the jackpot (top award) symbol. Before spinning the reels 30, the player can touch any symbol. Alternatively, the player may only be allowed to select certain symbols that are predefined as capable of serving as the jackpot symbol. In the illustrated example, the player touches a small fish symbol 88. Touching the small fish symbol 88 opens a pop-up window 90. Using the pop-up window 90, the player can then press a "yes" button 92 to make the small fish symbol 88 the jackpot symbol or the "no" button 94 to keep the small fish symbol 88 in its existing position within the pay hierarchy. Although the illustrated example only allows the player to change a selected symbol to the jackpot symbol, it should be understood that pop-up windows could also be used to configure the selected symbol so that it is in any desired position within the pay hierarchy.

Figure 13:
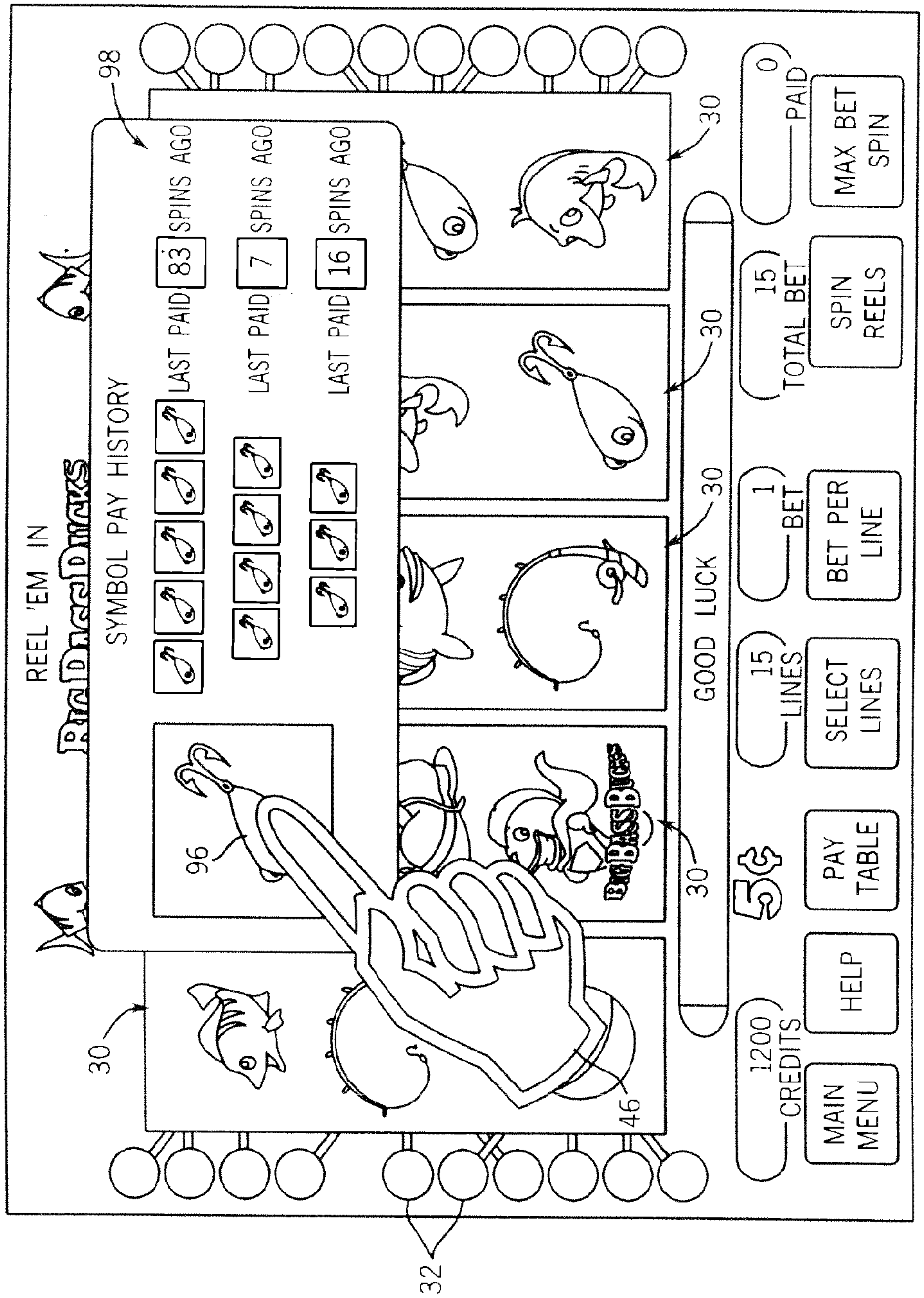
FIG. 13 is a display image showing the use of a pop-up window to view a pay history for a selected symbol.

FIG. 13 is a display image showing the use of a pop-up window to view a pay history for a selected symbol. Before spinning the reels 30, the player can touch any symbol. Alternatively, the player may only be allowed to select certain symbols that are predefined as capable of displaying their pay history. In the illustrated example, the player touches a lure symbol 96. Touching the lure symbol 96 opens a pop-up window 98. The pop-up window 98 provides information about when different winning combinations including the lure symbol 96 last occurred. In the illustrated example, a winning line pay of five lure symbols 96 last occurred 83 spins ago; a winning line pay of four lure symbols 96 last occurred 7 spins ago; and a winning line pay of three lure symbols 96 last occurred 16 spins ago.

The information in the pay history may vary. For example, the pay history may include the number of occurrences of each winning combination in a predetermined or player-selected number of prior spins. Also, the pay history may include time interval information showing an amount of time elapsed since each winning combination last occurred. Each winning combination may be associated with a respective timer counting up from 00:00:00:00 (i.e., days, hours, minutes, seconds):

| | | | | | |
|---|---|---|---|---|---|
| lure | lure | lure | lure | lure | 00:00:17:10 |
| lure | lure | lure | lure | — | 00:00:01:54 |
| lure | lure | lure | — | — | 00:00:03:27 |

Upon the occurrence of one of the winning combinations, the respective timer for that combination is reset to zero. Each timer may track the total real time or the total playing time (with coin-in) elapsed since the associated combination last occurred.

The pay history offers a number of significant advantages. First, the pay history assists in gaining the trust of players who perceive gaming machines as manipulating the probabilities in their own favor. The pay history serves as an accounting of recent plays and may reassure players that the machine does, in fact, pay out. For more sophisticated players, the pay history may even serve as evidentiary proof of the math and pay tables underlying the game. Second, the pay history serves as a powerful psychological tool that can take advantage of player perceptions. The pay history communicates information indicative of past outcomes without requiring a player to witness the machine over an extended period of time. Based on this information, the player may perceive the machine or certain outcomes to be "hot" or "cold" or due to hit and make his/her play decisions accordingly. The pay history subtly encourages players to strategize their play and alter their play strategies from the norm. For example, in the case of machines attached to progressive jackpots or large jackpot giveaways, on the one hand some players may avoid such machines because they do not believe the jackpots to be achievable. On the other hand, some players may gravitate toward such machines when they believe the jackpot is due to hit. The pay history may communicate to players when the last jackpot occurred, thereby providing players with a psychological benefit that the jackpot is achievable and/or is due to hit.

Figure 14:
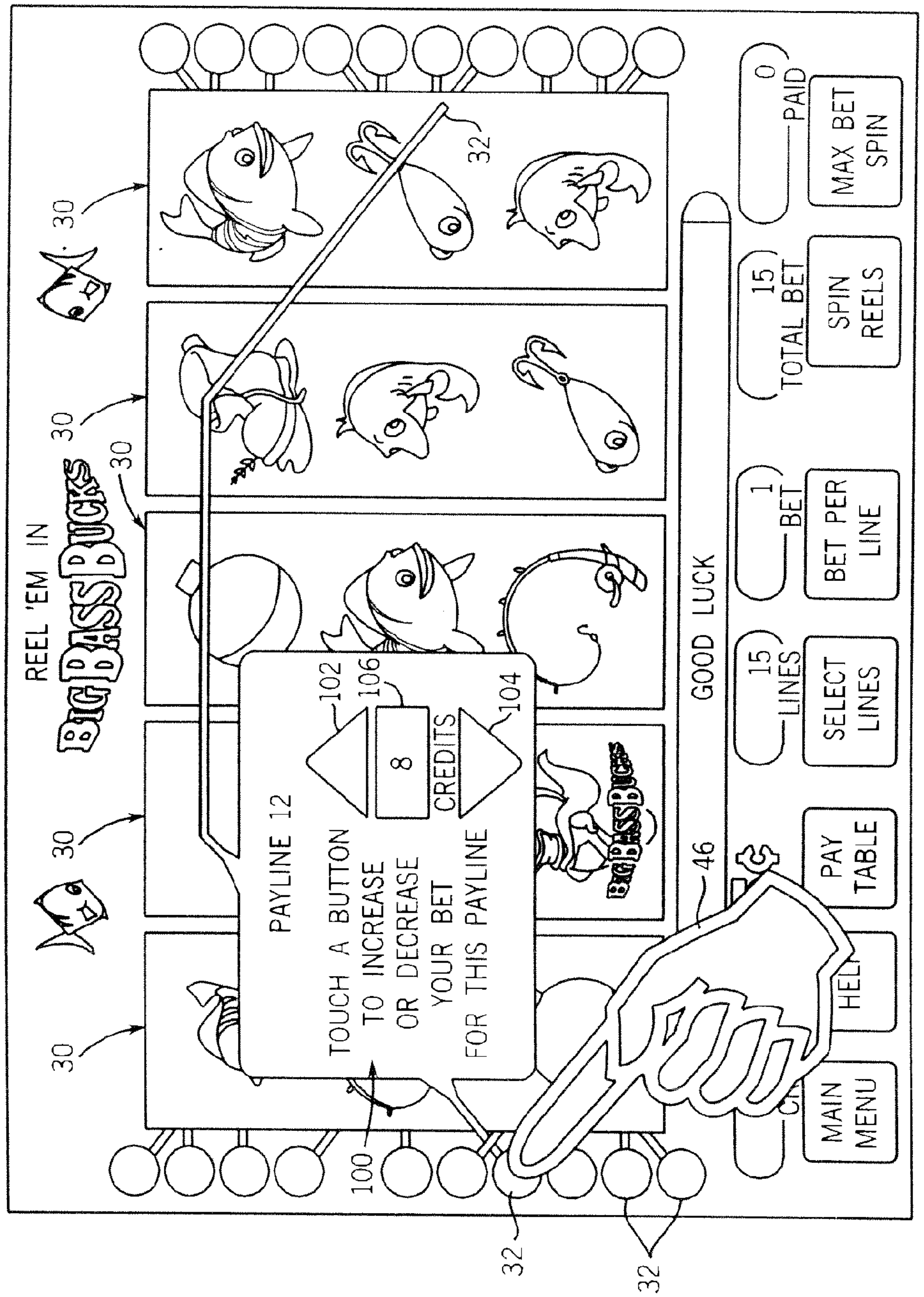
FIG. 14 is a display image showing the use of a pop-up window to adjust a wager on an individual pay line.

FIG. 14 is a display image showing the use of a pop-up window to adjust a wager on an individual pay line. Instead of wagering the same number of credits on each pay line 32 as in most conventional reel slot games, the player can wager any desired number of credits on each pay line 32. While placing his or her wager before spinning the reels 30, the player can touch the bubble at the end of any pay line 32. In the illustrated example, the player touches a bubble at the end of a roof-shaped pay line 32. Touching the bubble opens a pop-up window 100. Using the pop-up window 100, the player can increase his/her wager for that pay line 32 by pressing an "up" arrow 102 or decrease his/her wager for that pay line 32 by pressing a "down" arrow 104. The pop-up window 100 may present other interfaces, such as an onscreen numerical keypad, for adjusting the wager on a selected pay line 32.

As described above in connection with FIGS. 3 through 7, pop-up windows may be used to allow a player to make a side-bet. Placing a side-bet utilizing the pop-up window enables the player to make an additional wager to "purchase" one of any number of game enhancements or make an additional wager that the game outcome will include a particular symbol or symbol combination, depending on the side-bet scheme enabled for a particular gaming machine. For example, side-betting schemes utilizing pop-up windows may allow a player to (1) increase his/her odds to trigger bonus game play, (2) increase the value payout associated with bonus game play, (3) both increase the odds of triggering bonus game play and increase associated value payouts, (4) increase the value payouts associated with winning outcomes during basic game play, for example, to "buy a multiplier" (BAM) that would multiply any value payout associated with a winning game outcome by a predetermined amount that is based on the side-bet amount, to side-bet that a symbol combination will appear in any pay line or in a particular pay line, or to side-bet that a particular symbol will appear in the game outcomes. Side-betting schemes utilizing pop-up windows may also allow a player to (5) ensure receipt of a value payout in a predetermined amount for non-winning outcomes, (6) activate additional game features, (7) after a partial game outcome is displayed, (i) increase the value payouts associated with winning outcomes during basic game play or (ii) invoke a right-to-left line pay, (8) activate an extra wild symbol that is capable of being repositioned within an outcome symbol array to yield a higher value payout, (9) in the case of a slot game, providing a possibility of an additional movement of a stopped reel to reposition an extra reel symbol, provided above or below the outcome symbol array, into the outcome symbol array to yield an increased value payout, or (10) providing a possibility of generating an extra pay line that includes an extra reel symbol, provided above or below the outcome symbol array, if the extra pay line results in an increased value payout, to name a few. In addition, placing more than one side-bet via more than one pop-up window may enable the player to "purchase" more than one game enhancement.

To increase coin in revenue, side-betting utilizing a pop-up window is preferably only available to a player when a minimum criteria is met, for example when a maximum bet is placed, or in the case of a slot game, when a maximum number lines are selected for activation. Further, it is contemplated that repeated side-bets utilizing pop-up windows may be placed prior to each game to increase the coin-in revenue per game. A "Repeat the Bet" button may be also provided via the display 12 to allow a player to repeat side-bets.

Upon detecting a first wager from a player to play a wagering game on the gaming machine 10, the CPU 18 enables a side-bet scheme if the first wager includes a minimum criterion. The minimum criteria may vary depending on the type of wagering game. For example, the side-bet scheme may be enabled when the CPU 18 detects that the player has activated the maximum number of lines for a slot game.

When the side-bet scheme is activated, the player may place one or more side-bets via one or more pop-up windows. Each pop-up window is displayed when the CPU 18 detects player selection (via touching) of one of the symbols of the symbol array displayed on the gaming machine. In response to detecting player selection of the symbol, the CPU 18 displays an associated side-bet pop-up window. The associated side-bet pop-up window preferably includes at least one player selectable option. Each player selectable option is associated with a number of winning side-bet outcomes that preferably include occurrences of the selected symbol. A symbol specific pay table may also be displayed in the pop-up window.

The player may select one of the player selectable options offered in the pop-up window by placing a side-bet or "second wager" for an amount displayed, preferably in an amount button, in the pop-up window. The player selects the amount of the second wager by touching the amount button one or more times, depending on the second wager amount desired. The player may then close the pop-up window and select additional symbols to invoke additional pop-up windows, or the player may initiate game play as previously discussed (e.g. spin the reels of a slot game). If the game outcome includes one or more winning symbol combinations, the player is awarded an award, typically game credits. In addition, if the game outcome includes one or more winning side-bet outcomes, the player is awarded a second award, typically game credits, a bonus game, free spins, etc. Separate side-bet meters displayed on the video display inform the player of the side-bet and the status of the side-bet outcome.

In the case of a mechanical spinning reel machine having an overlaid flat panel transmissive display, player selection of a particular side-bet is preferably made via a touch screen button provided by the transmissive display. Alternatively, or in addition to the touch screen buttons, mechanical buttons may be provided on the player control panel 44 to enable player selection of a particular side-bet. Thus, player selection of one or more side-bet options may be made when a player depresses a particular lighted or highlighted mechanical button provided on the player control panel 44.

It is also contemplated that, if activated by an adequate game wager as described above, the side-betting scheme may allow the player may place one or more side-bets after a portion of the game outcome is revealed but before the game outcome is fully revealed to the player. For example, in the case of a five reel video slot game, a partial game outcome may be displayed by stopping the two or three leftmost spinning reels while the remaining reels continue to spin. The player, viewing a partial game outcome may then have an option, via a pop-up window as described above, of placing a second wager to "purchase" a right to left line pay, or placing a second wager to increase or multiply a winning game outcome. If the full game outcome includes one or more winning symbol combinations, the player is awarded a first award and if the full game outcome further includes one or more winning side-bet outcomes, the player is awarded a second award.

Figure 15:
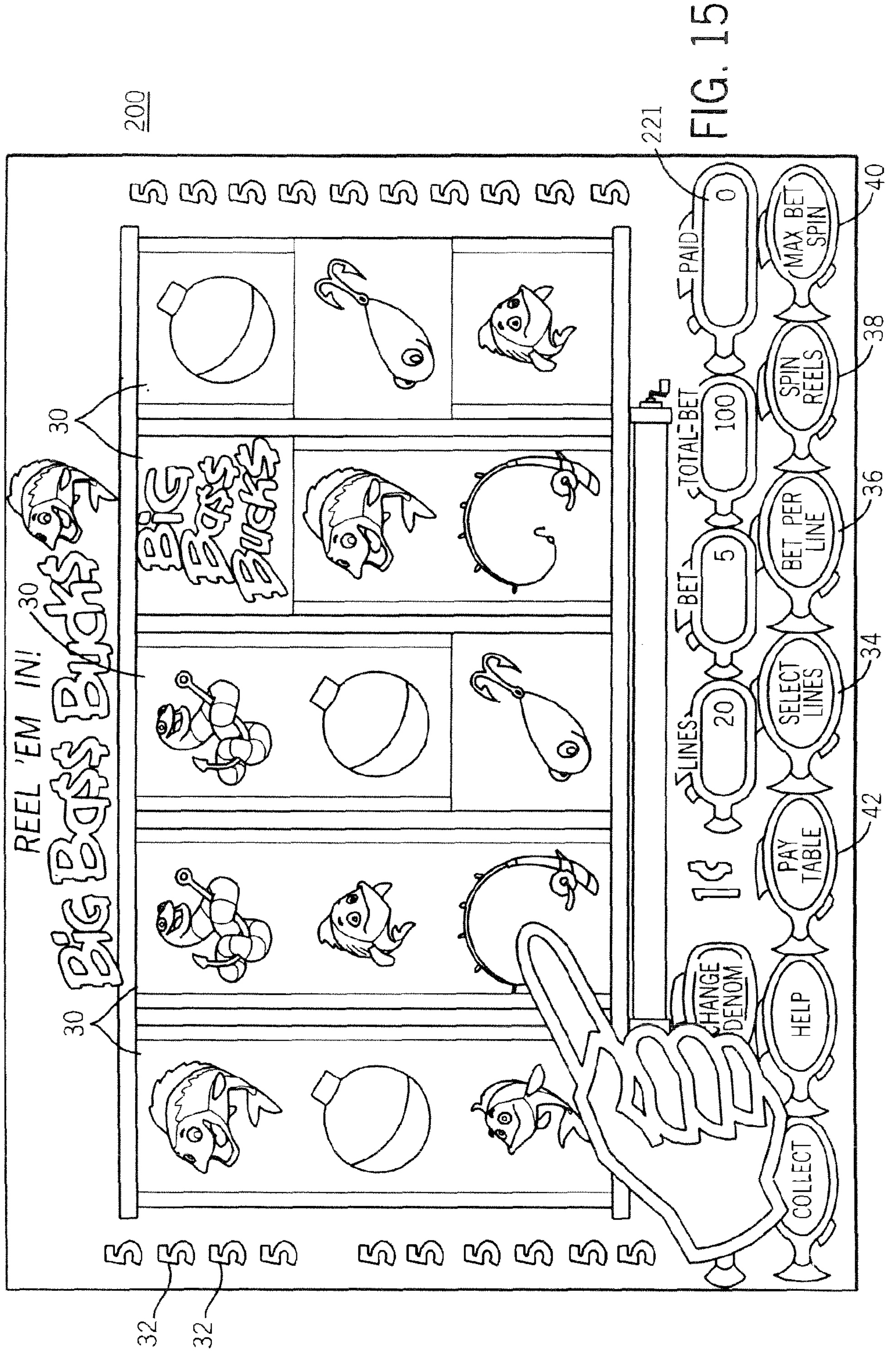
FIGS. 15 through 19 are a series of display images showing the use of a pop-up window to provide a player option to increase the value payout associated with a winning outcome during basic game play.
Figure 16:
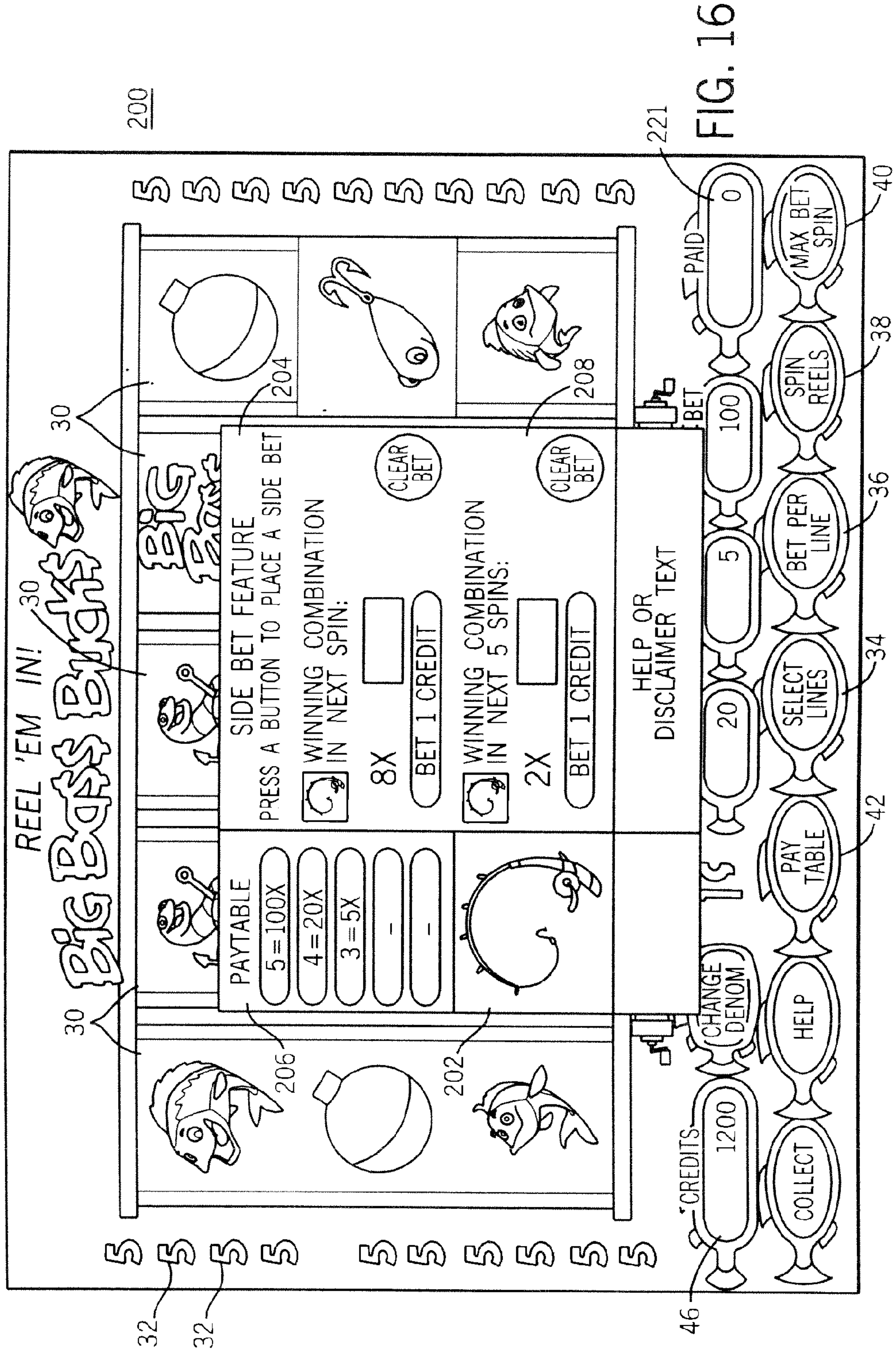

FIGS. 15 through 19 are a series of display images 200 showing the use of a pop-up window to provide an option, that when selected by the player, increases the value payout associated with a winning outcome during basic game play; in this case, provides an option to make a one-spin side-bet. Before spinning the reels 30 and preferably after placing the game wager (i.e., the first wager), the player can touch any symbol to place a side-bet, or second wager (FIG. 15). In the illustrated example, the player touches a fishing pole symbol 202. Touching the fishing pole symbol 202 opens a pop-up window 204 (FIG. 16). The pop-up window 204 includes a symbol-specific pay table area 206 preferably displayed above the fishing pole symbol 202, and a side-bet feature choice area 208 preferably displayed adjacent to the fishing pole symbol 202 and the symbol-specific pay table area 206.

The pop-up symbol-specific pay table area 206 offers a number of advantages to the player as well as the casino operator. First, it enables the player to view the line pays or value payouts associated with occurrences of the fishing pole symbol 202, without having to select the "Pay Table" key 42, causing the CPU 18 to toggle the display 12 between the display image 200 and a pay table image. Second, because the player does not need to toggle back and forth between the display image 200 and the pay table image to view the pay table, the player is able to focus on wagering and associated game play. In addition, other information, for example, Help text, may be displayed via the pop-up side-bet window.

In the illustrated example, the symbol-specific pay table area 206 indicates that an occurrence of three fishing pole symbols 202 along an active pay line will yield a value payout of five times the amount wagered per line (e.g., five times 5 credits), that an occurrence of four fishing pole symbols 202 along an active pay line will yield a value payout of twenty times the amount wagered per line, and that that an occurrence of five fishing pole symbols 202 along an active pay line will yield a value payout of one-hundred times the amount wagered per line.

Figure 17:
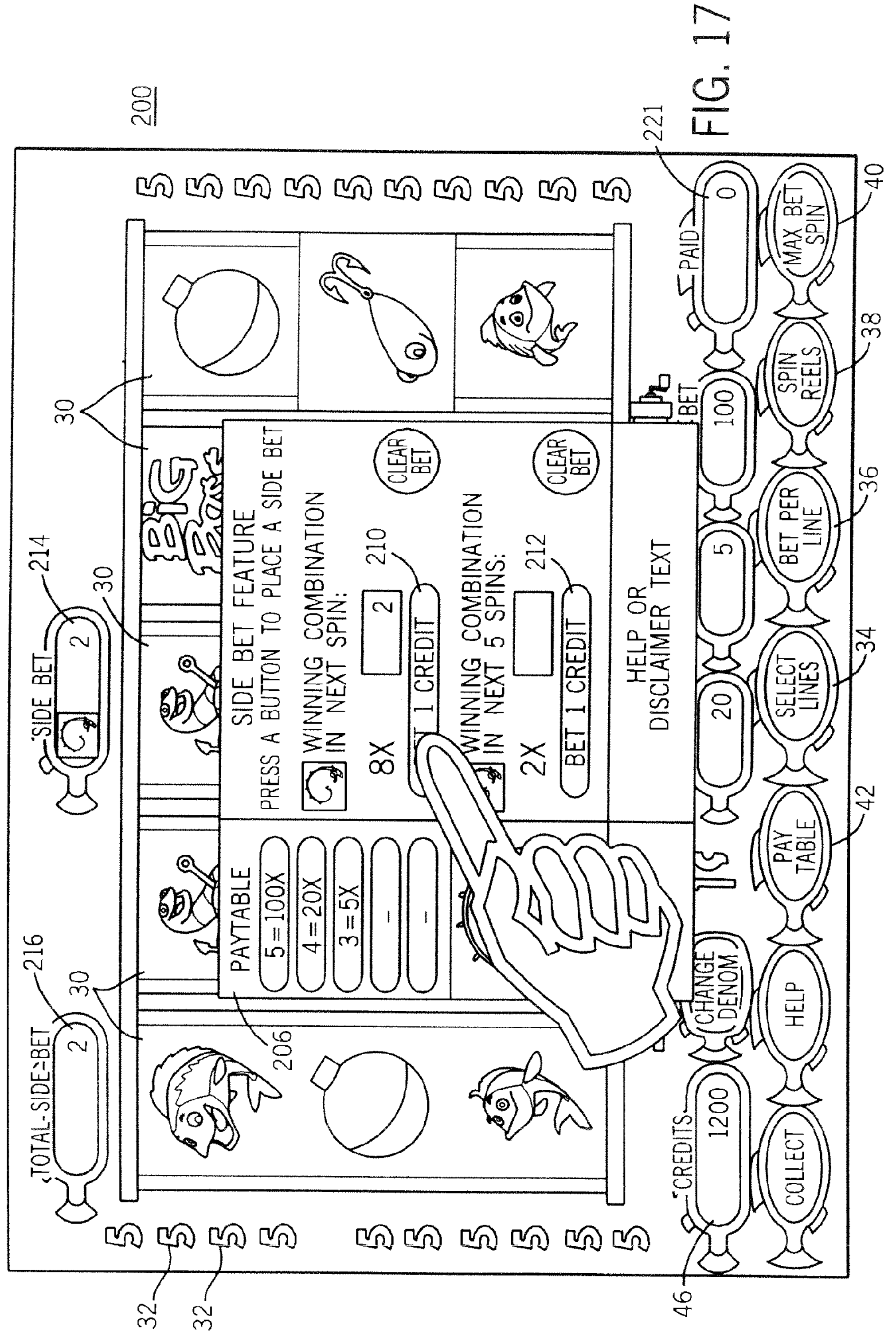

Using the pop-up window 204, the player can then place the side-bet wager that the fishing pole symbol 202 will yield a line pay either (i) on the next reel spin (which pays the "next spin" side-bet multiplied by 8) by touching an onscreen button 210 or (ii) at any point during the next five reel spins (which pays the "next 5 spins" side-bet multiplied by 2) by touching an onscreen button 212. In the illustrated example, the player selects the onscreen button 210 twice indicating a side-bet wager of two credits that the fishing pole symbol 202 will yield a line pay on the next reel spin (FIG. 17).

Upon detecting player selection of the online button 210, the CPU 18 causes one or more symbol-specific side-bet meter(s) 214 and a total side-bet meter 216 to be displayed on the display 12. The symbol-specific side-bet meter(s) 214 indicates the number of side-bet credits wagered for each individual symbol per game. The total side-bet meter 216 indicates a total number of side-bet credits wagered for all individual symbol(s) per game.

Figure 18:
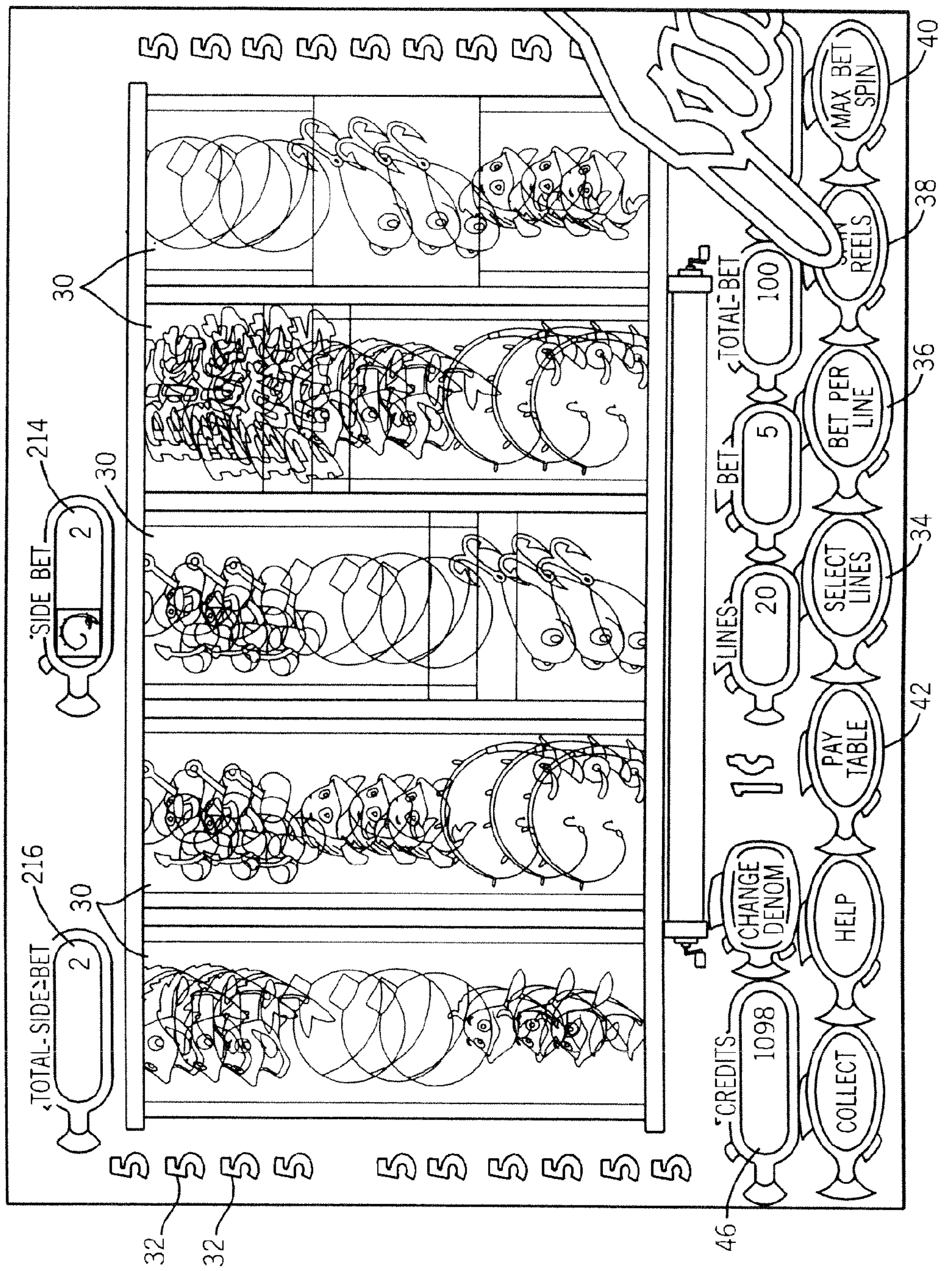

After selecting a number of pay lines to play (e.g., 20 pay lines), a number of credits to wager on each pay line (e.g., 5 credits per pay line) and the side-bet wager, the player may set the reels 30 in motion by touching the "Spin Reels" key 38 or, if the player wishes to bet the maximum amount per line, by touching the "Max Bet Spin" key 40. FIG. 18 depicts the reels 30 in motion. Preferably, no player input is accepted during the reel spin unless the side-betting scheme specifically allows the player to place a side-bet after a partial game outcome is displayed (discussed below). In addition to setting the reels 30 in motion, detection of player selection of either the "Spin Reels" key 38 or the "Max Bet Spin" key 40 causes the credit meter 46 to decrement by the wagered game credit amount and wagered side-bet credit amount. In the illustrated example, the credit meter 46 decrements from 1200 credits to 1098 credits to reflect the 100 credits wagered on the basic game (i.e., the first wager) and the 2 credits wagered on the side-bet (i.e., the second wager).

Figure 19:
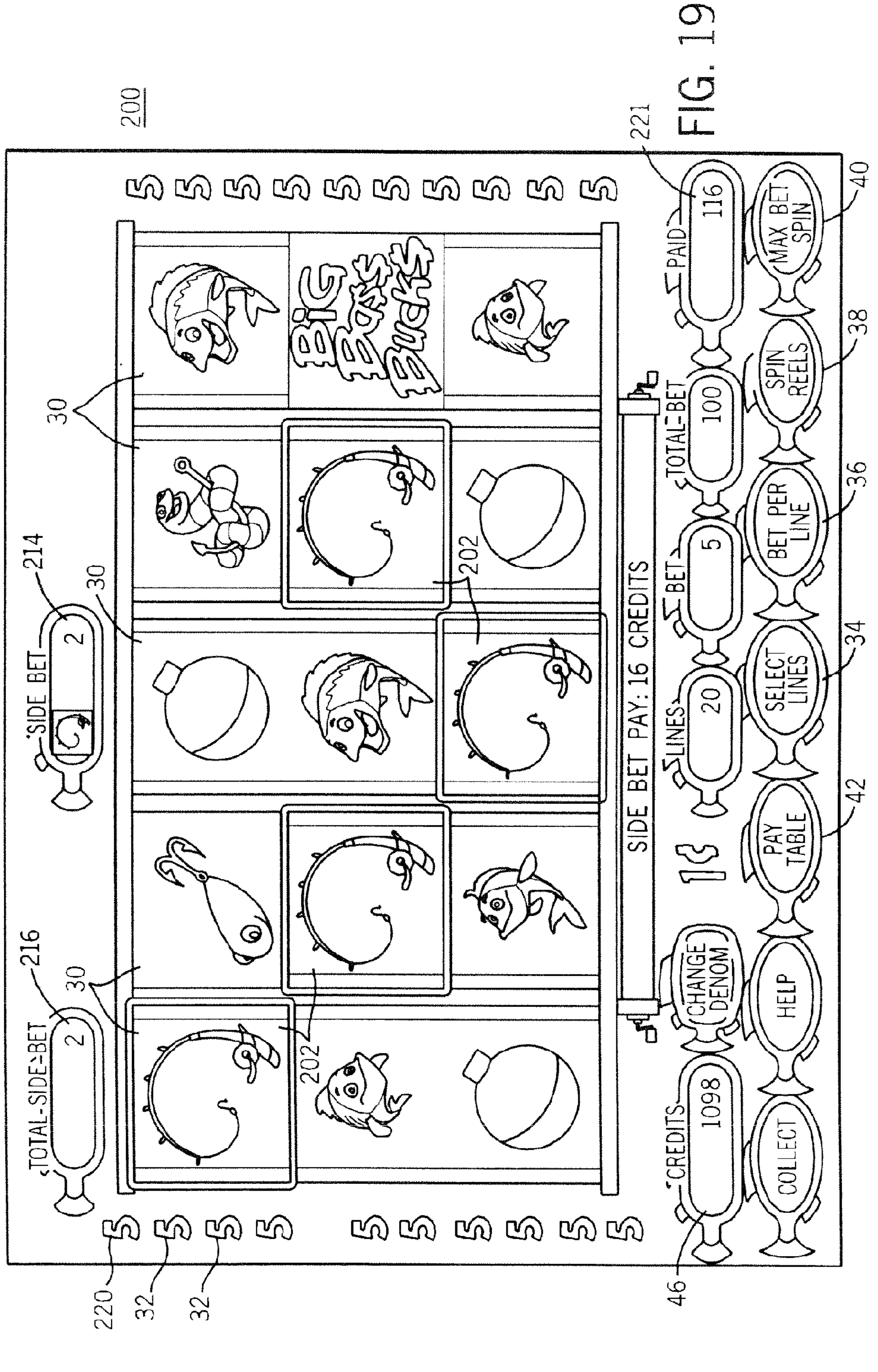

Referring to FIG. 19, the reels 30 stop with four fishing pole symbols 202 along an active pay line 220. Therefore, in addition to a standard payout of 100 credits as displayed by the pop-up symbol-specific pay table area 206 for fishing pole symbol 202, the player is also awarded a side-bet award of 16 credits for a total of 116 credits as indicated on a pay meter 221.

Figure 20:
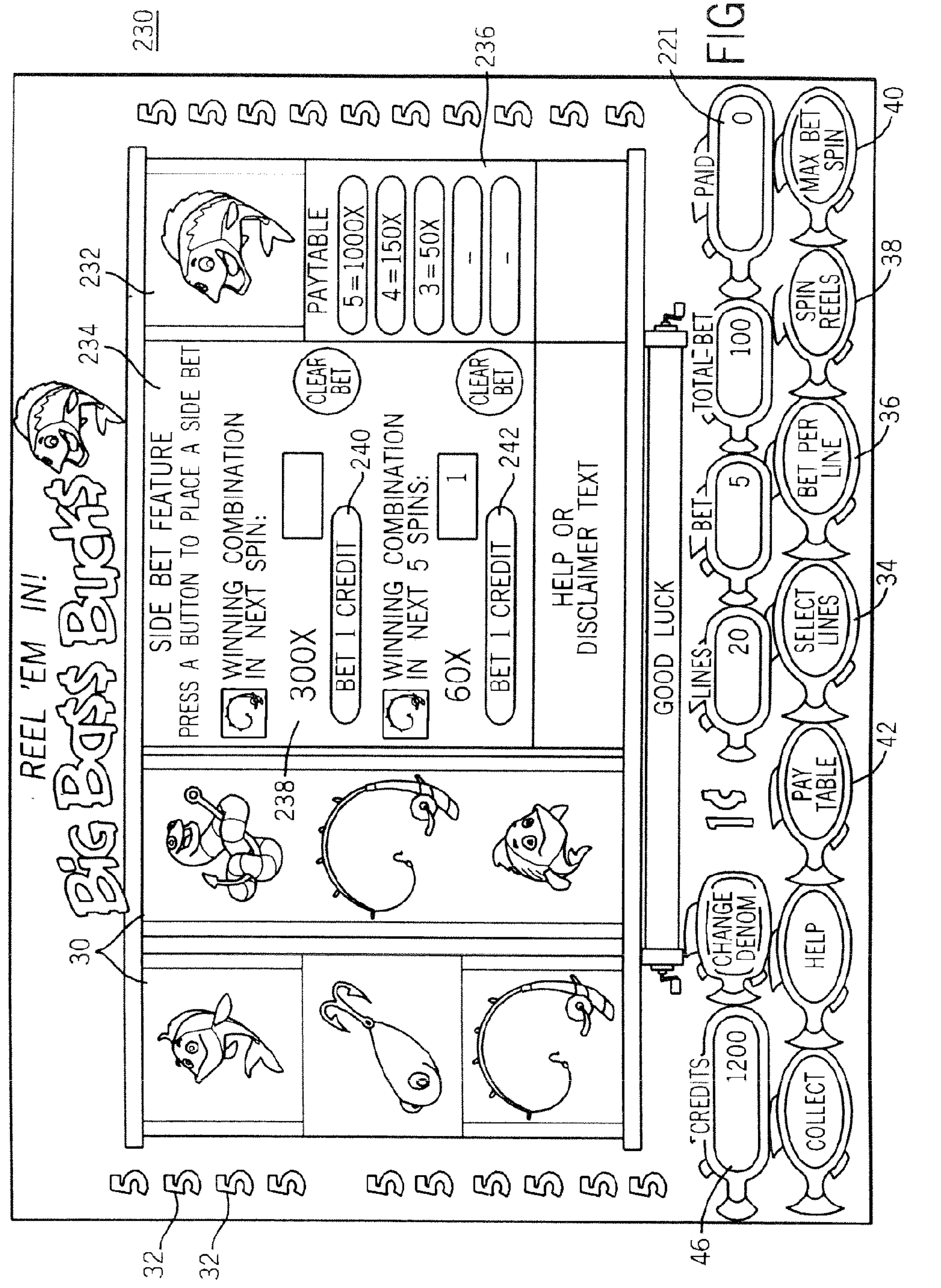
FIGS. 20 through 23 are a series of display images showing the use of a pop-up window to provide another player option to increase the value payout associated with a winning outcome during basic game play.

Similarly, FIGS. 20 through 23 are a series of display images 230 showing the use of a pop-up window to provide another option, that when selected by the player, increases the value payout associated with a winning outcome during basic game play; in this case, provides an to make a five-spin side-bet. Before spinning the reels 30, the player can touch any symbol to place the side-bet (FIG. 20). In the illustrated example, the player touches a bass symbol 232 and opens a pop-up window 234. The pop-up window 234 includes a symbol-specific pay table area 236 preferably displayed below the bass symbol 232, and a side-bet feature choice area 238 preferably displayed adjacent to the bass symbol 232 and the symbol-specific pay table area 236.

In the illustrated example, the symbol-specific pay table area 236 indicates that an occurrence of three bass symbols 232 along an active pay line will yield a value payout of fifty times the amount wagered per line (e.g., fifty times 5 credits), that an occurrence of four bass symbols 232 along an active pay line will yield a value payout of one-hundred and fifty times the amount wagered per line, and that that an occurrence of five bass symbols 232 along an active pay line will yield a value payout of one-thousand times the amount wagered per line.

Using the pop-up window 234, the player can then place a side-bet wager that the bass symbol 232 will yield a line pay either (i) on the next reel spin (which pays the "next spin" side-bet wager multiplied by 300) by touching an onscreen button 240 or (ii) at any point during the next five reel spins (which pays the "next 5 spins" side-bet wager multiplied by 60) by touching an onscreen button 242. In the illustrated example, the player selects the onscreen button 242 once indicating a side-bet wager of one credit that the bass symbol 232 will yield a line pay on one or more of the next five reel spins.

Figure 21:
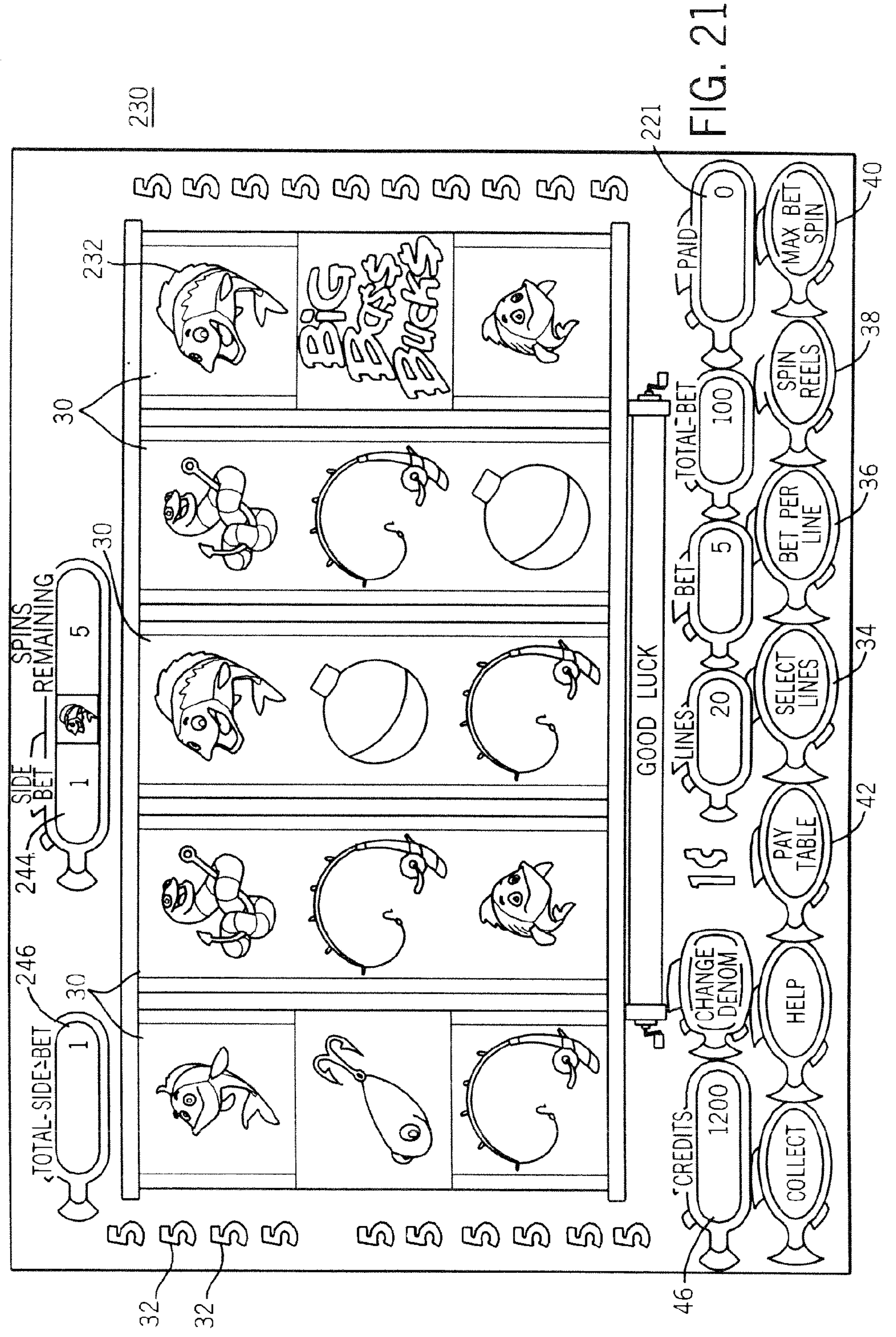
Figure 22:
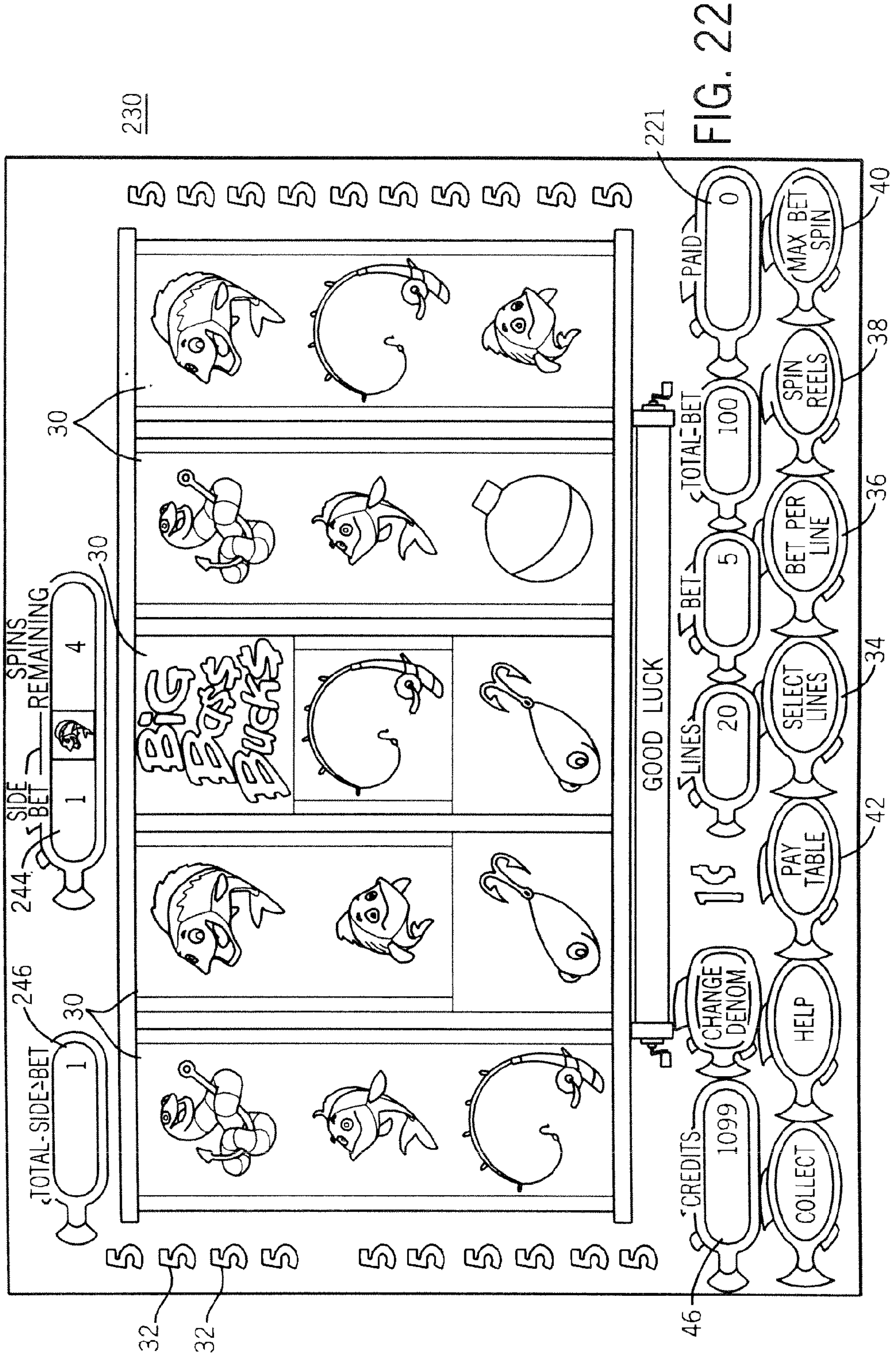

Upon detecting player selection of the online button 242, the CPU 18 causes one or more symbol-specific side-bet meter(s) 244 including a spins-remaining field indicating the number of spins remaining for the side-bet, and a total side-bet meter 246 to be displayed on the display 12 (FIG. 21). The symbol-specific side-bet meter(s) 244 indicates the number of side-bet credits wagered for each individual symbol per game. The total side-bet meter 216 indicates a total number of side-bet credits wagered for all individual symbol(s) per game. Thus, in the illustrated example of FIG. 21, the symbol-specific side-bet meter(s) 244 indicates that a 1-credit side-bet was placed to "purchase" a 60 times multiplier for any line pay associated with winning symbol combinations of the bass symbol 232 occurring during the next five games. To fully collect on the 1 credit side-bet, the player is required to place basic game play wagers for five games. The total wager for the five spins may therefore be 101 credits for spin 1 initiation, 100 credits for spin 2 initiation, 100 credits for spin 3 initiation, 100 credits for spin 4 initiation and 100 credits for spin 5 initiation for a total of 501 credits. In addition, each time a side-bet is placed that spans multiple games, the player is notified if insufficient credits exist to complete the multiple games.

After selecting a number of pay lines to play (e.g., 20 pay lines), a number of credits to wager on each pay line (e.g., 5 credits per pay line) and the side-bet wager, the player may set the reels 30 in motion (not separately illustrated). Preferably, no player input is accepted during the reel spin unless the side-bet scheme specifically allows the player to place a side-bet after a partial game outcome is displayed (discussed below). In addition to setting the reels 30 in motion, detection of player selection of either the "Spin Reels" key 38 or the "Max Bet Spin" key 40 causes the credit meter 46 to decrement by the wagered game credit amount and wagered side-bet credit amount, and causes the spins remaining field of the symbol-specific side-bet meter(s) 244 to decrement by one. In the illustrated example of FIG. 22, the credit meter 46 decrements from 1200 credits to 1099 credits to reflect the 100 credits wagered on the basic game and the 1 credit wagered on the side-bet. No winning symbol combinations along an active pay lines resulted. Accordingly, no credits are paid to the player and the spins-remaining field of the symbol-specific side-bet meter(s) 244 reflects that four spins remain on the five spin side-bet.

Figure 23:
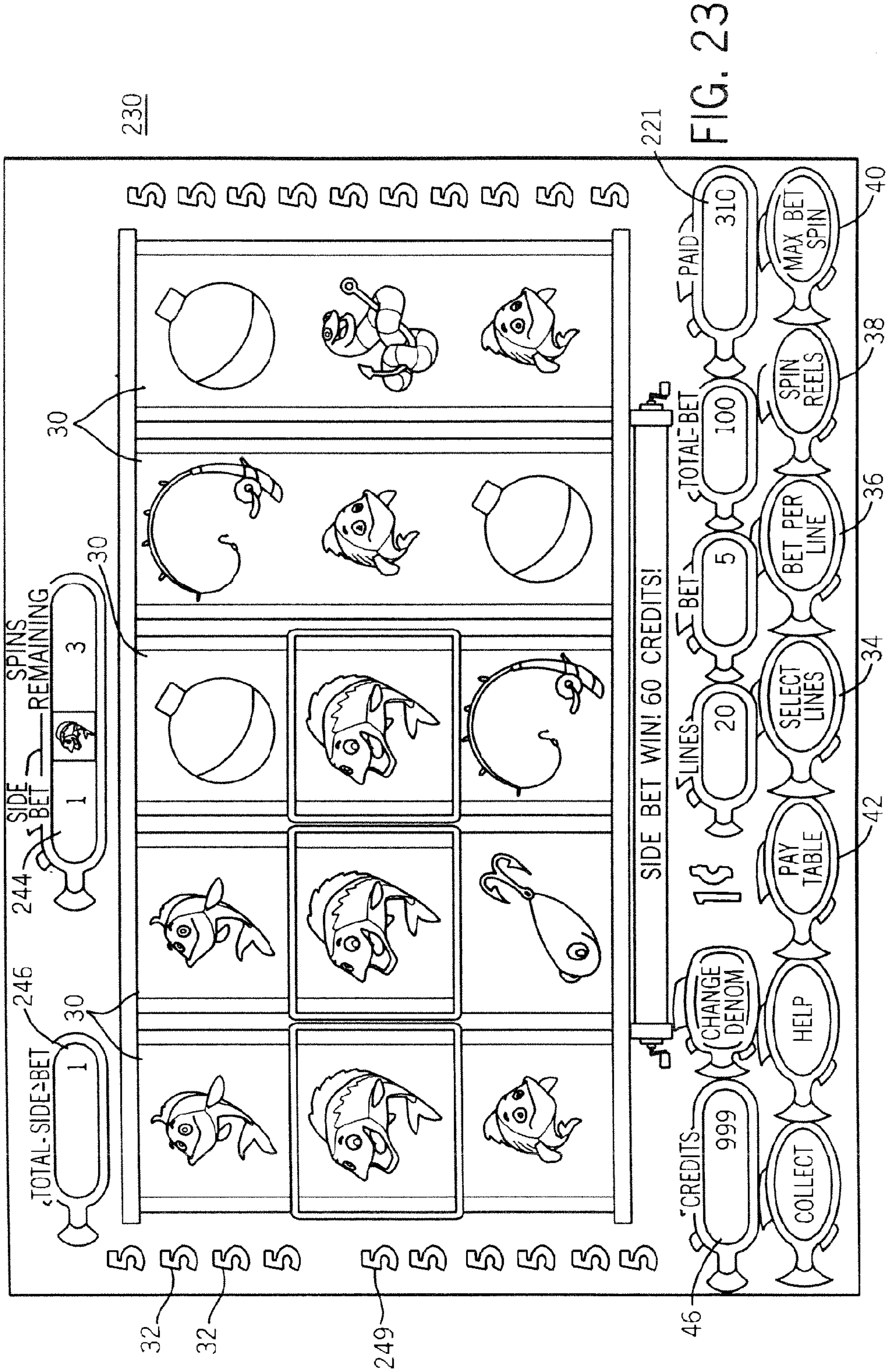

After again selecting the number of pay lines to play (e.g., 20 pay lines) and the number of credits to wager on each pay line for game two (e.g., 5 credits per pay line), the player may set the reels 30 in motion. As illustrated in FIG. 23, the reels 30 stop with three bass symbols 232 along an active pay line 249. Therefore, in addition to a standard payout of 250 credits for three bass symbols 232 along the active pay line 249, the player is also awarded a side-bet award of 60 credits for a total of 310 credits as shown on the pay meter 221.

Figure 24:
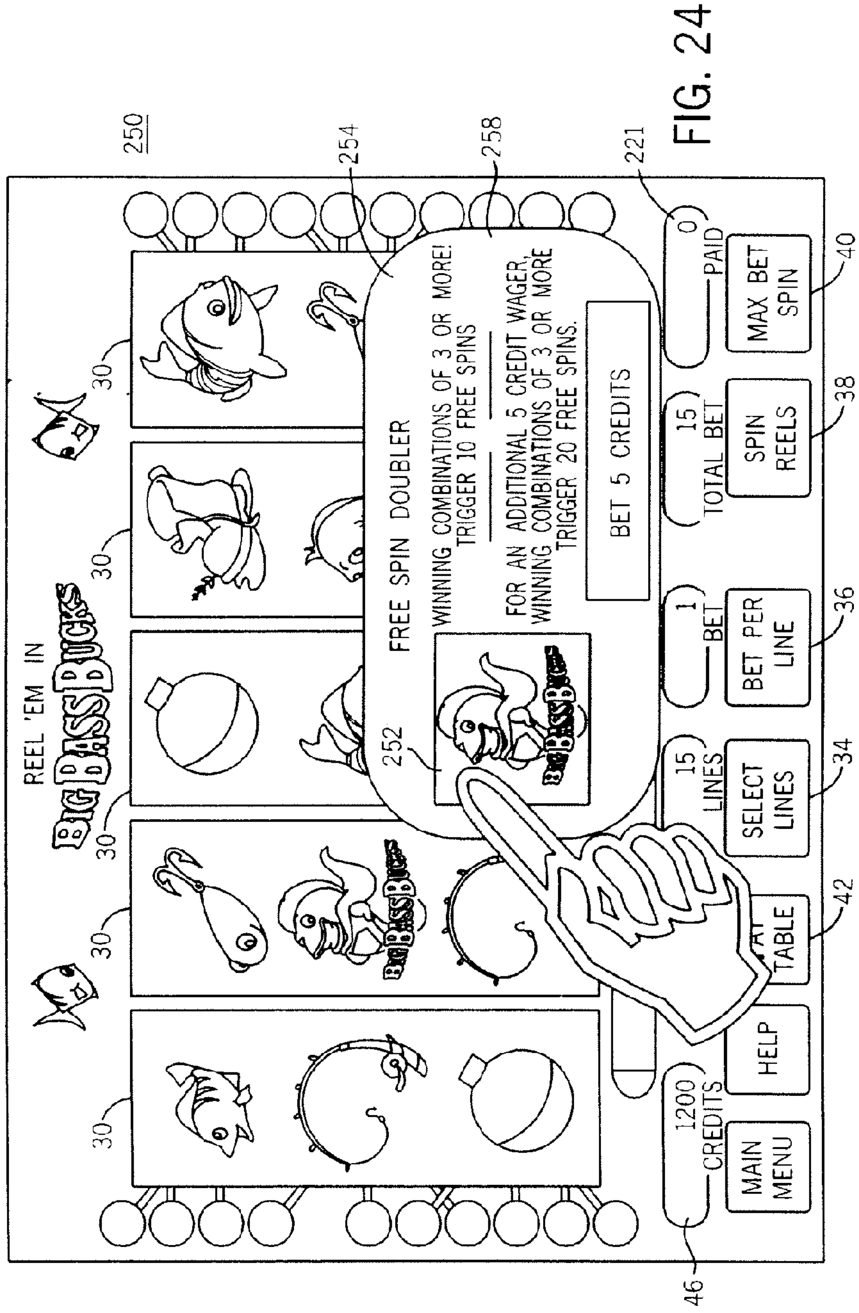
FIGS. 24 through 26 are a series of display images showing the use of a pop-up window to provide a player option to increase the value payout associated with bonus game play via increasing a number of free spins upon an occurrence of a winning symbol combination.
Figure 25:
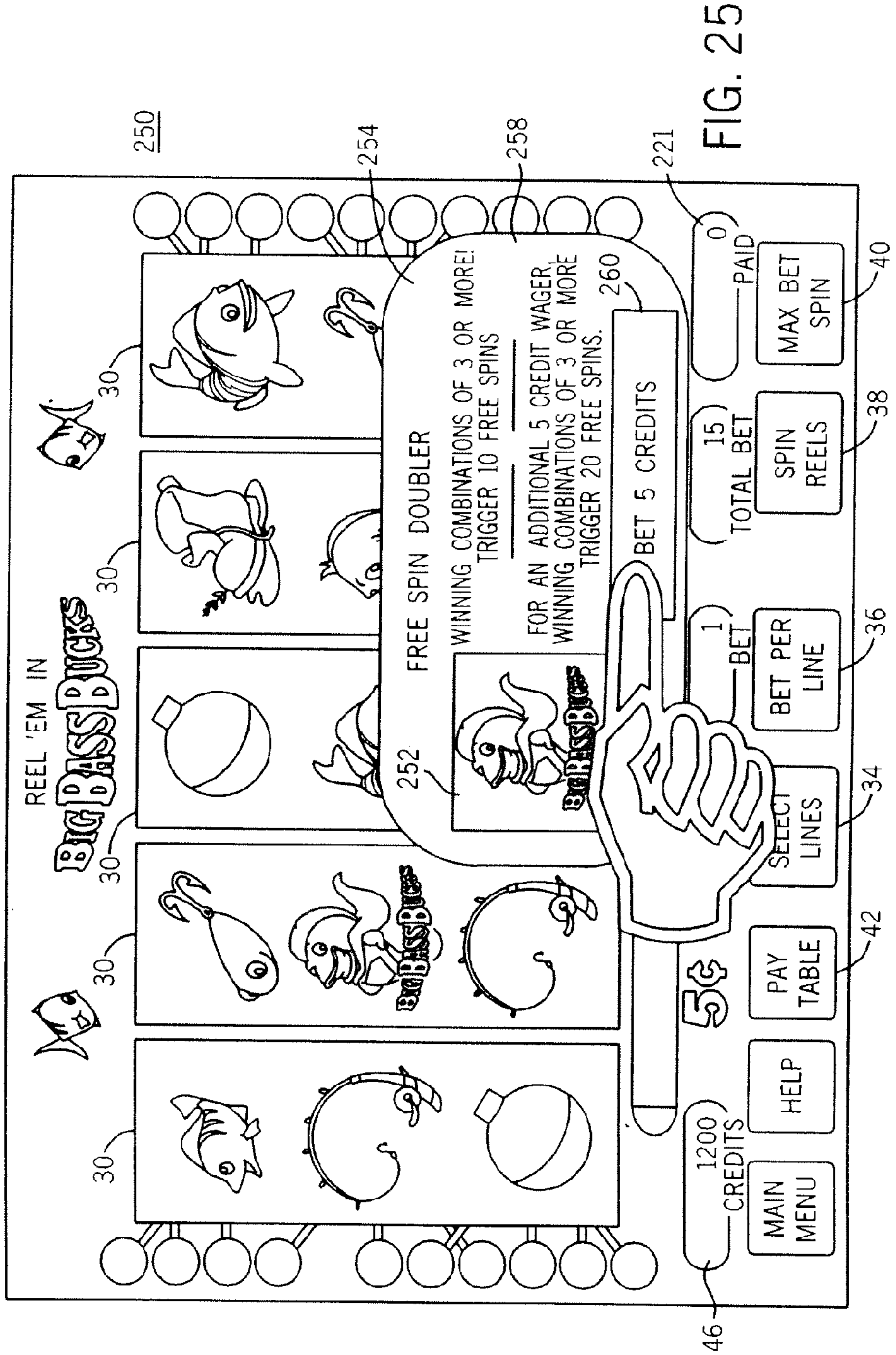
Figure 26:
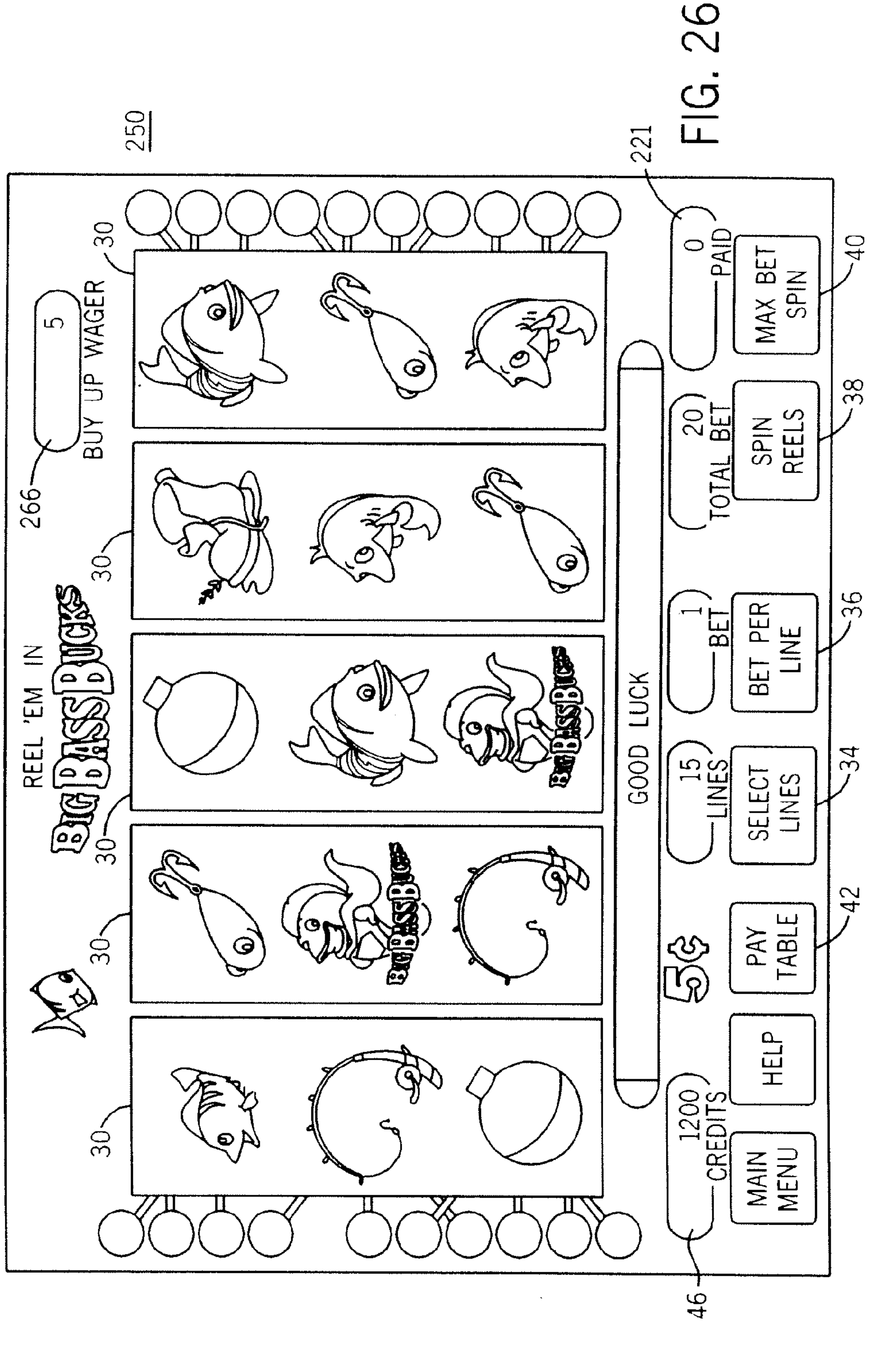

FIGS. 24 through 26 are a series of display images 250 showing the use of a pop-up window to provide an option, that when selected by the player, increase the value payout associated with bonus game play; in this case, an option to increase 10 free spins to 20 free spins upon a winning symbol combination. Before spinning the reels 30, the player can touch any symbol to place the side-bet (FIG. 24). In the illustrated example, the player touches a big bass bucks symbol 252. Touching the big bass bucks symbol 252 opens a pop-up window 254. The pop-up window 254 includes a side-bet feature choice area 258 preferably displayed adjacent to the big bass bucks symbol 252. Although not separately illustrated, the pop-up window 254 may also include a symbol-specific pay table area as discussed above.

In the illustrated example, the side-bet feature choice area 258 indicates that (i) an occurrence of three or more big bass bucks symbols 252 along an active pay line will yield a bonus of 10 free spins. Using the pop-up window 254 however, (ii) the player can double the number of free spins for an additional side-bet of 5 credits. In other words, for a side-bet of 5 credits, an occurrence of three or more big bass bucks symbols 252 along an active pay line will yield a bonus of 20 free spins.

Referring to FIG. 25, the player selects the onscreen "Bet 5 Credits" button 260 once to "purchased," for 5 credits, a bonus of 20 free spins to be paid upon an occurrence of three or more big bass bucks symbols 252 along an active pay line. Referring to FIG. 26, a "Buy Up Wager" meter 266 displayed above the reels 30 indicates the player's selection of the 5 credit side-bet. In the illustrated example, the player wagered a first wager of 15 credits (i.e., 1 credit bet per pay line for 15 pay lines) plus a second wager of 5 credits for the side-bet to increase 10 free spins to 20 free spins upon an occurrence of a side-bet winning outcome (e.g., three, four or five big bass bucks symbol 252 on an active pay line). Thus, the pop-up window providing various side-bet options allows a player to enhance his/her game play experience, while at the same time provides increased revenue for the gaming proprietor or casino operator.

Although only a few examples of placing a side-bet utilizing a pop-up window are specifically illustrated herein using the series of game display images above (i.e., increasing the value payout associated with bonus game play and increasing the value payouts associated with winning outcomes during basic game play), other examples may be similarly illustrated. For example, game display images may be utilized to illustrate a pop-up window side-bet scheme where a value output associated with a winning symbol combination is multiplied by a predetermined integer that is based on the side-bet amount. In other words, game display images may reflect a pop-up window side-bet scheme that allows a player to "buy a multiplier". Game display images may also be utilized to illustrate a pop-up window side-bet schemes that allow a player to make a side-bet that a reel symbol combination will appear in any pay line or in a particular pay line. Game display images may also be utilized to illustrate a pop-up window side-bet scheme that increases a player's odds of triggering bonus game play, that increases the odds of triggering bonus game play and increases the associated value payouts, that ensures a predetermined value payout for non-winning outcomes, that activates additional game features, that increases the value payouts associated with winning outcomes during basic game play after a partial game outcome is displayed, that activates an extra wild symbol capable of being repositioned within an outcome symbol array to yield a higher value payout, that provides a possibility of an additional movement of a stopped reel to reposition an extra reel symbol, provided above or below the outcome symbol array, into the outcome symbol array to yield an increased value payout, that provides a possibility of generating an extra pay line that includes an extra reel symbol, provided above or below the outcome symbol array, if the extra pay line results in an increased value payout, to name a few.

While the present invention has been described with reference to one or more particular embodiments, those skilled in the art will recognize that many changes may be made thereto without departing from the spirit and scope of the present invention.

For example, in view of the player's selections, the CPU may adjust other parameters (e.g., odds, payout schedules, functions of other symbols, etc.) of the game to ensure a desired house advantage. Further information about adjusting such parameters may be obtained from U.S. Pat. No. 6,068,552 to Walker et al., which is incorporated herein by reference.

In the illustrated examples, a player may "close" a pop-up window (i.e., remove the pop-up window from the display image) by touching any part of the display image outside the pop-up window. Alternatively or in addition, the pop-up window itself may include an onscreen "close" or "minimize" button akin to the buttons found in Microsoft Windows™.

Figure 27:
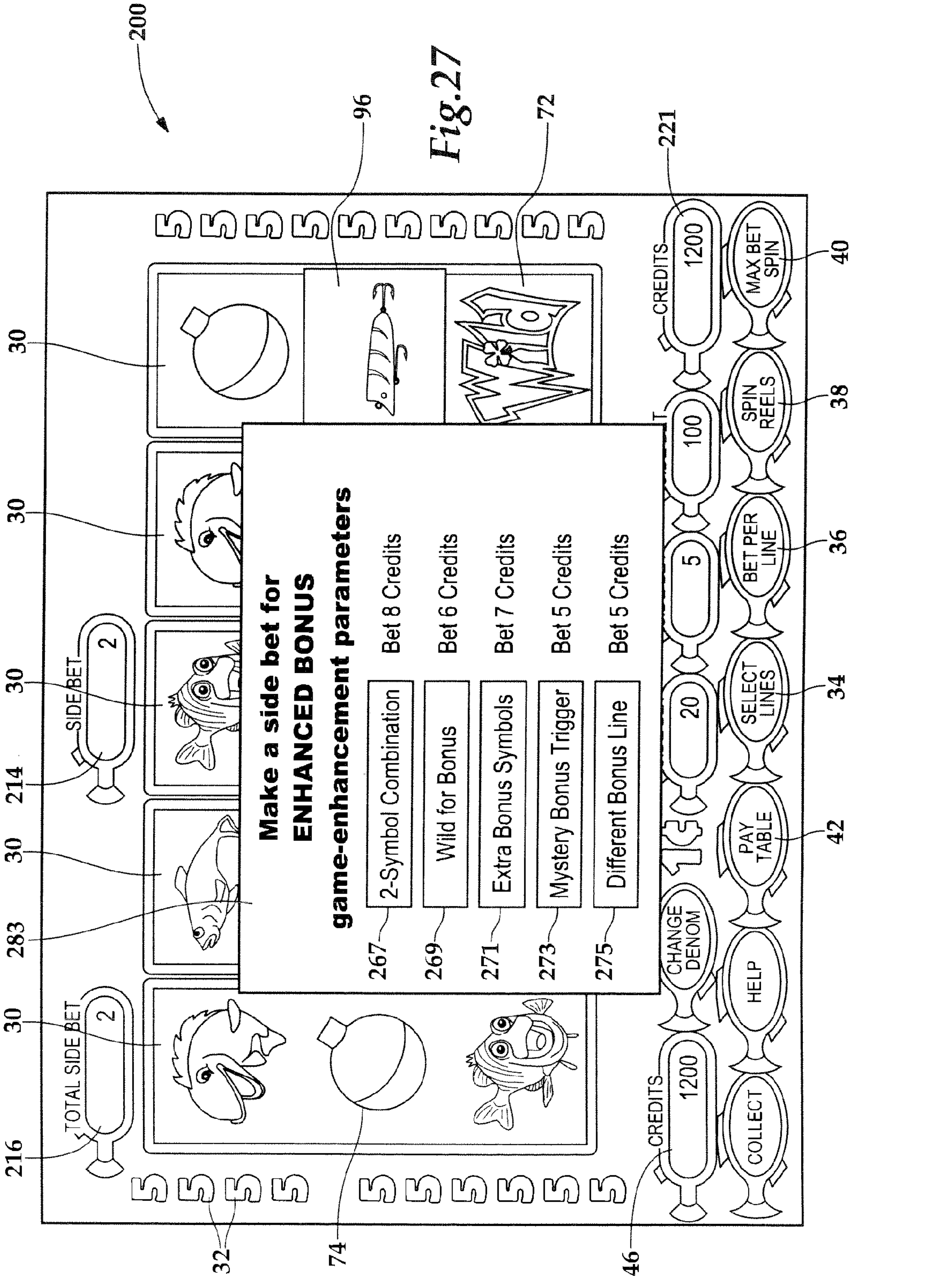
FIG. 27 illustrates a pop-up window that displays various available "EASIER BONUS" game-enhancement parameters that are available for purchase via a side-bet.

Additional embodiments of the invention are directed to systems and methods for permitting the player to make a side-bet, in addition to the standard initial bet, to provide bonus game play that is easier to achieve. For example, as shown in FIG. 27, a pop-up window 265 is displayed to the player displaying various available "EASIER BONUS" game-enhancement parameters that are available for purchase via the side-bet. The pop-up window 265 may be displayed before the reels 30 begin spinning. In other embodiments, the pop-up window 265 may be displayed while the reels 30 are spinning, or after at least one of the reels 30 has stopped spinning.

The player may be shown various side-bet options for a set of the EASIER BONUS game-enhancement parameters such as "2-Symbol Combination" 267, "Wild for Bonus" 269, "Extra Bonus Symbols" 271, "Mystery Bonus Trigger" 273, or "Different Payline" 275. Additional EASIER BONUS game-enhancement parameters may also be available, such as "Re-spin with Reels Held," "Multiple Bonus Triggers," "Scatter," and "Nudge-To-Bonus."

In some embodiments, all of these side-bet options are displayed at once to the player and the player is given the opportunity to place a side-bet on one or more of these options. In other embodiments, only a single one of these options is randomly displayed to the player at a time. Each EASIER BONUS game-enhancement parameter may be purchased with a particular side-bet. Some are more expensive than others for purchase. As shown in the pop-up window 265, the "2-Symbol combination" EASIER BONUS game-enhancement parameter 267 may be purchased for 8 credits, the "Wild for Bonus" EASIER BONUS game-enhancement parameter 269 may be purchased for 6 credits, the "Extra Bonus Symbols" EASIER BONUS game-enhancement parameter 271 may be purchased for 7 credits, the "Mystery Bonus Trigger" EASIER BONUS game-enhancement parameter 273 may be purchased for 5 credits, and the "Different Payline" EASIER BONUS game-enhancement parameter 275 may be purchased for 5 credits. The illustrated costs of these EASIER BONUS game-enhancement parameters are merely examples, and the actual cost of the side-bet to purchase each of these game-enhancement parameters may be different from the amounts displayed in the pop-up window 265. The effect of the player's selection of each of these EASIER BONUS game-enhancement parameters will now be described.

"2-Symbol Combination": In the event that the player selects the "2-Symbol Combination" EASIER BONUS game-enhancement parameter and makes the requisite side-bet, bonus game play that is ordinarily triggered upon a combination of at least three bonus-triggering symbols may instead be triggered by a two bonus-triggering symbol combination. For example, if a combination of three of the "hook" symbols 96 of FIG. 27 is a bonus-triggering symbol combination, and the player achieves a combination of only two "hook" symbols 96, the bonus game play would still be triggered if the side-bet to purchase the "2-Symbol Combination" EASIER BONUS game-enhancement parameter 267 had been made at the appropriate time.

"Wild for Bonus": If the player chooses the "Wild for Bonus" EASIER BONUS game-enhancement parameter 269 and makes the requisite side-bet, a wild symbol that is normally wild only for achieving a payout during base game play will also become wild for triggering the bonus game play. For example, if three of the "hook" symbols 96 are required to trigger the bonus and the player has achieved a combination of two "hook" symbols 96 and a "Wild" symbol 72, the bonus game will be triggered if the player had made the side-bet for the "Wild for Bonus" EASIER BONUS game-enhancement parameter 269 at the appropriate time.

"Extra Bonus Symbols": If the player chooses the "Extra Bonus Symbols" EASIER BONUS game-enhancement parameter 271 and makes the requisite side-bet, a symbol that is normally not a wild symbol (e.g., a "bobber" symbol 74) becomes wild. The "bobber" symbol 74 may become wild to allow the player to achieve the highest-paying symbol combination after a spin. In some embodiments, all occurrences of one particular symbol (e.g., the "bobber" symbol 74) becomes wild. In other embodiments, all occurrences of multiple symbols (e.g., the "bobber" and the "hook" symbols 74 and 96) become wild. In embodiments where multiple symbols become wild, the player may be required to make a larger bet for the option of transforming the multiple different symbols into wild symbols than would be required to make a single symbol the wild symbol.

"Mystery Bonus Trigger": The player may also make a side-bet to purchase the "Mystery Bonus Trigger" EASIER BONUS game-enhancement parameter 273. The "Mystery Bonus Trigger" EASIER BONUS game-enhancement parameter 273 triggers the bonus game via an invisible trigger. In other words, the same bonus game that is triggered upon achieving a certain symbol combination (e.g., the combination of the hook symbols 96) may also be triggered by the invisible trigger. The trigger is invisible because prior to the spin the player does not know that the trigger is. For example, in the event that the mystery trigger is an occurrence of a single "bobber" symbol 74, and a combination of three "hook" symbols 96 is normally required to trigger the bonus, the occurrence of a single “bobber” symbol 74 would trigger the bonus regardless of whether any “hook” symbols 96 were achieved on the reels 30. The mystery trigger may be randomly selected.

The mystery trigger need not be based on the outcome of a spin of the reels—e.g., instead of assigning a particular symbol as the mystery trigger, the mystery trigger could instead be the occurrence of randomly selected event not shown to the player. For example, the mystery trigger could be the occurrence of the number 100 on a random number generator that generates a random number after each spin, but does not display the random number or the random number generator, or any of this process of randomly selecting numbers to the player.

“Different Payline”: The “Different Payline” EASIER BONUS game-enhancement parameter 275 provides an additional payline that is different than any of the standard paylines. For example, the player could potentially end up with a combination that is not a winning outcome on any of the standard paylines, but is instead a winning combination on the additional payline. This additional payline may be selected from a set of multiple additional paylines. In some embodiments, this option is available to the player only after the maximum amount of paylines have been purchased. The player has the ability to manually select the symbol positions forming the additional payline (e.g., the top symbol on the first reel, the bottom symbol on the second reel, the top symbol on the third reel, the middle symbol on the fourth reel, and the top symbol on the fifth reel) additional payline in some embodiments. For example, the player may touch the display screen around a symbol on each of the reels 30 to create the different payline. The player may also be presented with an option of a second additional payline for an additional side-bet.

“Re-spin with Reels Held”: The “Re-spin with Reels Held” EASIER BONUS game-enhancement parameter re-spins some reels after an initial spin. It is implemented when the player has achieved the start of a winning combination on the first two reels. For example, if three “hook” symbols 96 are required for a winning combination of “hook” symbols 96 and the player has achieved two “hook” symbols 96 on the first two reels, the “Re-spin with Reels Held” EASIER BONUS game-enhancement parameter automatically re-spins the last three reels, giving the player a chance to achieve a better winning combination.

In some embodiments, the player is required to achieve at least two symbols of a winning combination, and only the other reels not forming part of the winning combination are re-spun. Accordingly, in the event that the player has achieved a winning combination of three “hook” symbols 96 on the first three reels, only the last two reels would be re-spun to give the player the opportunity to achieve a better combination (e.g., four “hook” symbols 96). However, if the player has only received the two “hook” symbols 96, then the last three reels would all be re-spun to give the player an extra chance at a winning combination.

“Multiple Bonus Triggers”: The “Multiple Bonus Triggers” EASIER BONUS game-enhancement parameter provides the player with additional bonus triggers. For example, in the event that the occurrence of the “bobber” symbol 74 does not normally trigger a bonus, implementation of the “Multiple Bonus Triggers” EASIER BONUS game-enhancement parameter would cause a non-bonus-triggering symbol such as the “bobber” symbol 74 to transform into a bonus-triggering symbol.

“Scatter”: The “Scatter” EASIER BONUS game-enhancement parameter converts a single-line bonus-triggering combination into a scatter payline bonus-triggering combination, such that symbols of a bonus-triggering combination need not be located all on a single active payline. Instead, the symbols of the bonus-triggering combination may be scattered across the reels.

“Nudge-to-Bonus”: The “Nudge-to-Bonus” game-enhancement parameter is advantageous in situations where a bonus can be triggered by moving symbols on one (or multiple) reels either up or down across a payline. This game-enhancement parameter automatically “nudges” the reels to the bonus-triggering combination to achieve the bonus-triggering combination. For example, in the event that a combination of three “hook” symbols 96 triggers the bonus and the three reels display a combination of “hook,” “hook,” and “bobber” symbols on an active payline, and a “hook” symbol 96 is located directly above the “bobber” symbol 74 on the third reel, the symbols on the third reel would be nudged downward so that three “hook” symbols 96 would be displayed on the payline, triggering the bonus.

Figure 28:
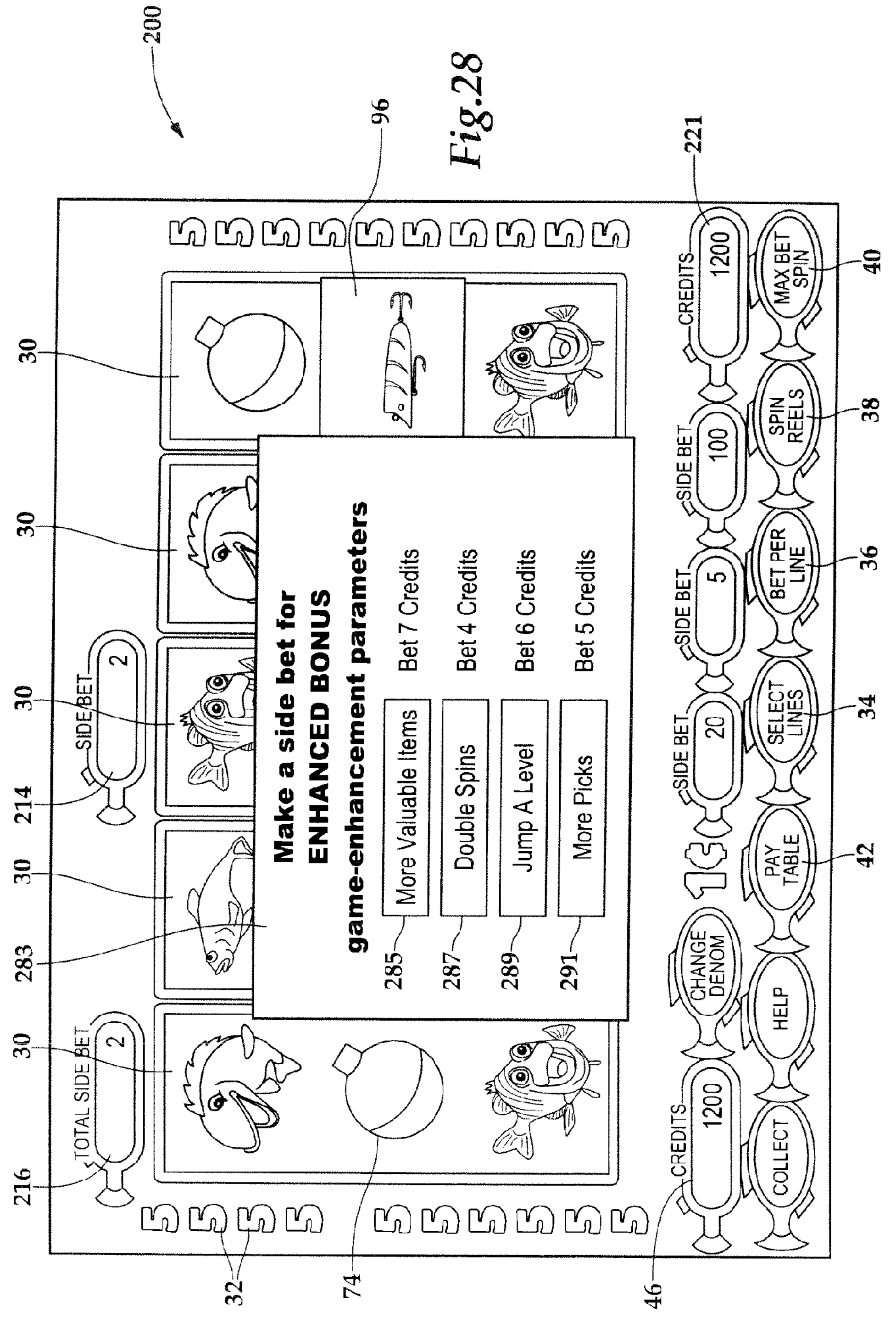
FIG. 28 illustrates a pop-up window having various "ENHANCED BONUS" game-enhancement parameters available for purchase by making the side-bet.

The player may also be presented with the option of making a side-bet to provide the player with a better paying bonus. In other words, the player can make the side-bet to purchase a larger expected value in the bonus game. As shown in FIG. 28, at the beginning of game play, the player is shown a pop-up window 283 having various “ENHANCED BONUS” game-enhancement parameters available for purchase by making a side-bet. The pop-up window 283 includes several ENHANCED BONUS game-enhancement parameters for causing a better paying bonus, including “More Valuable Items” ENHANCED BONUS game-enhancement parameter 285, “Double Spins” ENHANCED BONUS game-enhancement parameter 287, “Jump A Level” ENHANCED BONUS game-enhancement parameter 289, and “More Picks” ENHANCED BONUS game-enhancement parameter 291. Additional ENHANCED BONUS game-enhancement parameters such as “Eliminate Bonus-Game Ending Symbols” may also be available for purchase.

When game play is about to begin, the pop-up window 283 is displayed and the player is presented with the option of making a side-bet to obtain one or more of the ENHANCED BONUS game-enhancement parameters. In other embodiments, the pop-up window 283 is displayed immediately before bonus game play begins. As shown in the pop-up window 283, the “More Valuable Items” ENHANCED BONUS game-enhancement parameter 285 may be purchased for 7 credits, the “Double Spins” ENHANCED BONUS game-enhancement parameter 287 may be purchased for 4 credits, the “Jump A Level” ENHANCED BONUS game-enhancement parameter 289 may be purchased for 6 credits, and the “More Picks” ENHANCED BONUS game-enhancement parameter 291 may be purchased for 5 credits. The prices of the side-bets for each of these ENHANCED BONUS game-enhancement parameters are merely examples, and the actual cost of purchasing each of these game-enhancement parameters may be different from the amounts displayed in the pop-up window 283.

In some embodiments, a special screen showing the various available ENHANCED BONUS game-enhancement parameters is displayed to the player prior to the start of gameplay. In such embodiments, the pop-up window 283 is therefore unnecessary.

In some embodiments, all of the available ENHANCED BONUS game-enhancement parameters are shown to the player at once for selection. In other embodiments, the player only has the option of making a side-bet to obtain some, but not all, of the ENHANCED BONUS game-enhancement parameters.

Figure 29:
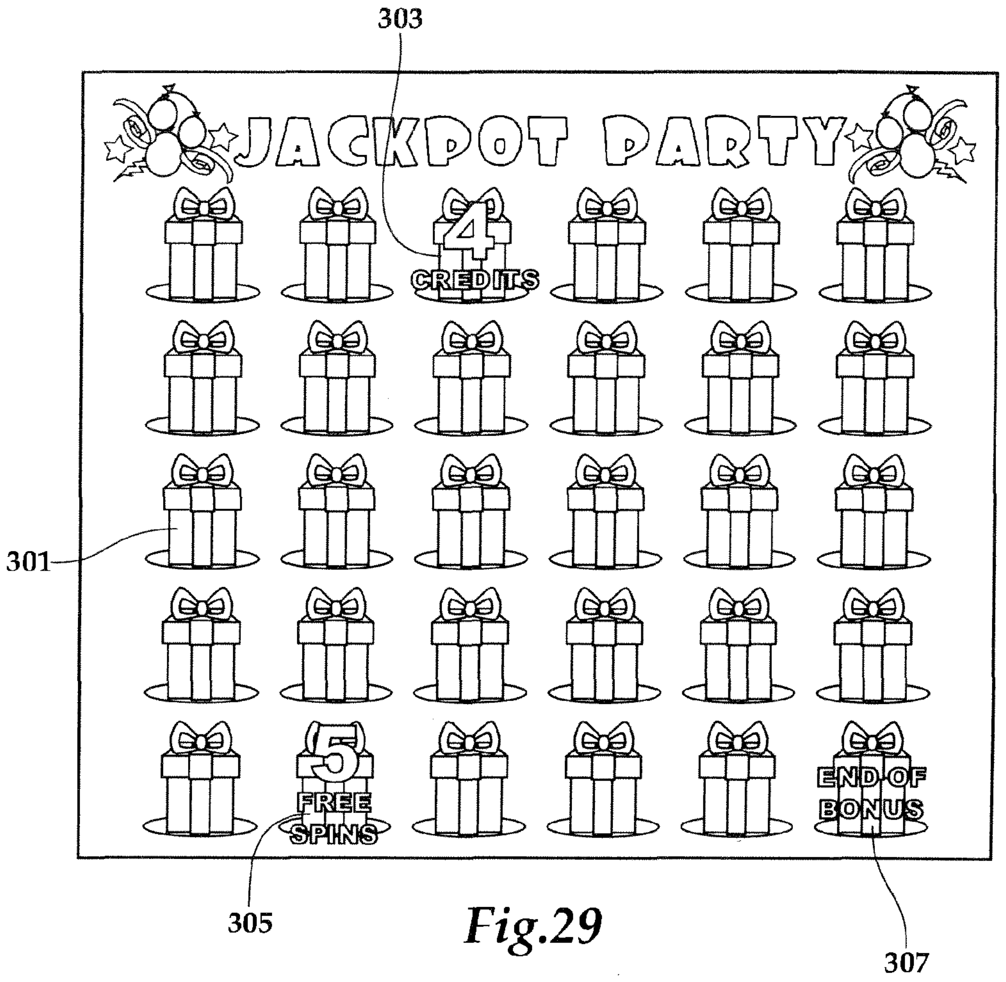
FIG. 29 illustrates a bonus game having a plurality of player-selectable elements.

FIG. 29 shows a bonus game having a plurality of player-selectable elements 301. Each of the player-selectable elements 301 masks (i.e., hides) an award or a bonus-game-ending item. Various masked awards include payouts, free spins, etc. As shown, a player-selectable element 303 masks an award of "4 credits," a player-selectable element 305 masks an award of "5 free spins," and a player-selectable element 307 masks an "end of bonus" item which ends the bonus game play when selected. Each of the ENHANCED BONUS game-enhancement parameters will now be described with respect to FIG. 29.

"More Valuable Items": The "More Valuable Items" ENHANCED BONUS game-enhancement parameter 285 is available when the bonus game involves the selection of player-selectable elements 301. When the "More Valuable Items" ENHANCED BONUS game-enhancement parameter 285 is purchased via the side-bet, the masked awards are replaced with more valuable items. For example, if a player-selectable element 301 masks a "5 credits" award, the purchase of the "More Valuable Items" ENHANCED BONUS game-enhancement parameter may result in this award being replaced with a more valuable award such as "15 credits."

"Double Spins": The "Double Spins" ENHANCED BONUS game-enhancement parameter 287 doubles the amount of the free spin awards contained within the bonus game. For example, in the event that the player has to select player-selectable elements 301 masking the awards, this ENHANCED game-enhancement parameter would double the amount of free spins masked by a particular player-selectable element 301 (e.g., doubling from 5 to 10 free spins). In the event that some of the player-selectable elements 301 mask awards other than free spins (e.g., credits), these non-free spin awards would not be modified according to some embodiments.

There are other types of bonus games in which the player is randomly awarded free spins without selecting any player-selectable elements 301. In these bonus games, the randomly awarded free spins are increased by a factor of two. In some embodiments, additional ENHANCED BONUS game-enhancement parameters are also available for purchase via a side-bet to triple, quadruple, etc., the number of free spins awarded during the bonus game.

"Jump A Level": The "Jump A Level" ENHANCED BONUS game-enhancement parameter 289 is valuable in a multi-level bonus game. Specifically, some bonus games have a plurality of levels on which the player can win bonus awards. The player usually starts off on a low, or the lowest, level and can move to higher levels having more valuable bonus awards. For example, in the event that the player is shown the array of player-selectable elements 301 of FIG. 29, the player can move to the next bonus level by, e.g., selecting a player-selectable element 301 masking an award that advances the player up one or more levels. Alternatively, the player may be automatically advanced after successfully selecting a predetermined number of player-selectable elements 301 without selecting a player-selectable element 301 masking a bonus-ending item.

When the "Jump A Level" ENHANCED BONUS game-enhancement parameter 289 is purchased, the player automatically starts the bonus game play on at least one level above the lowest level. As discussed, the "Jump A Level" ENHANCED BONUS game-enhancement parameter 289 is very valuable because each higher level has larger potential bonus awards than the level preceding it.

"More Picks": The "More Picks" ENHANCED BONUS game-enhancement parameter 291 awards the player with more selections of the player-selectable elements 301, and is of particular value when the player is given only a small number of selections of the player-selectable elements 301. For example, in some bonus games, the player only has the opportunity to select a set number of player-selectable elements 301 (e.g., 3 player-selectable elements). However, by purchasing the "More Picks" ENHANCED BONUS game-enhancement parameter 291, the player can increase the number of picks. For example, the player may be given 5 picks instead of 3 when the "More Picks" ENHANCED BONUS game-enhancement parameter 291 has been purchased.

"Eliminate Bonus-Game Ending Symbols": Some of the player-selectable elements 301 mask symbols that end the bonus game play. The "Eliminate Bonus-Game Ending Symbols" ENHANCED BONUS game-enhancement parameter eliminates bonus-game ending symbols, replacing them with various awards such as payouts or free spins.

Each of these embodiments and obvious variations thereof is contemplated as falling within the spirit and scope of the claimed invention, which is set forth in the following claims.

As will be appreciated by those skilled in the art, a number of other alternatives exist for enhanced game play schemes that increase the coin-in revenue per game played. For example, the player may be required to place an extra wager (i.e., the second wager) to buy virtually any feature or to make any feature available to the player.

As may be apparent from the discussion above, the gaming machine having a number of enhanced game play schemes increases coin-in revenue per game played and increases player enjoyment. Thus, unlike prior art schemes that allow a player to become eligible for possible game play via an additional wager (e.g., bonus game play, progressive jackpot game play), the gaming machine having one or more enhanced game play scheme allows a player "supersize" existing game play by enhancing base game play, enhancing bonus game play, enhancing the frequency of bonus game play, enhancing pay table value payouts, increasing the value of bonus awards, etc., via an additional wager amount.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

What is claimed is:

1. An electronic slot machine primarily dedicated to conducting a casino wagering game with a base game and a bonus game, the bonus game having an initial probability of being triggered during play of the base game, the slot machine comprising:

a cabinet configured to house electronic components operable for conducting the wagering game;

at least one electronic input device coupled to the cabinet and configured to receive physical inputs from a player and transform the physical inputs into electronic data signals, the physical inputs including a first physical input indicative of a first wager to play the wagering game, and a second physical input indicative of a second wager, distinct from the first wager, to enable one or more bonus-triggering-enhancement parameters each configured to increase the initial probability of triggering the bonus game to a higher probability of triggering the bonus game during play of the base game;

at least one electronic display device coupled to the cabinet and configured to display an outcome of the base game, the base-game outcome being randomly selected from a plurality of available base-game outcomes, the plurality of base-game outcomes including a bonus-triggering outcome;

at least one electronic random element generator configured to generate one or more random elements associated with play of the wagering game;

at least one processor; and at least one memory device storing instructions which, when executed by the at least one processor, cause the slot machine to:

initiate the base game of the wagering game in response to an electronic data signal generated by the at least one electronic input device responsive to the first physical input from the player input indicative of the first wager;

display, via the at least one electronic display device, the one or more available bonus-triggering-enhancement parameters and an option of submitting the second wager to purchase at least one of the one or more available bonus-triggering-enhancement parameters during a play of the base game, the purchased at least one bonus-triggering-enhancement parameter being selected from a group consisting of: a reduced-symbol-requirement bonus-triggering enhancement; a mystery-bonus-triggering enhancement; a scatter-symbol-bonus-triggering enhancement; a wild-symbol-bonus-triggering enhancement; and a nudge-to-trigger bonus-triggering enhancement;

determine an outcome of the base game of the wagering game based, at least in part, on the one or more random elements generated by the at least one electronic random element generator;

display, via the at least one electronic display device, the randomly determined outcome of the base game of the wagering game to the player; and transmit an indication of an award to the first player in response to the outcome of the base game meeting at least one predetermined award criterion, wherein the scatter-symbol-bonus-triggering enhancement modifies the bonus-triggering outcome to include a combination of bonus-trigger symbols appearing anywhere in the base-game outcome, and wherein the wild-symbol-bonus-triggering enhancement modifies an existing wild symbol appearing in the base-game outcome to also substitute for a bonus-trigger symbol required for the bonus-triggering outcome.

2. The slot machine of claim 1, wherein the bonus-triggering outcome is a combination of N predetermined bonus-trigger symbols appearing in the base-game outcome, and the purchased at least one bonus-triggering-enhancement parameter is the reduced-symbol-requirement bonus-triggering enhancement which reduces the bonus-triggering outcome from N predetermined bonus-trigger symbols to less than N predetermined bonus-trigger symbols appearing in the base-game outcome.

3. The slot machine of claim 1, wherein the purchased at least one bonus-triggering-enhancement parameter is the mystery-bonus-triggering enhancement which is an invisible mystery trigger configured to trigger the bonus game independent of symbols displayed in the base game.

4. The slot machine of claim 1, wherein the bonus-triggering outcome is the combination of predetermined bonus-trigger symbols appearing on an active payline in the base-game outcome, and the purchased at least one bonus-triggering-enhancement parameter is the scatter-symbol-bonus-triggering enhancement.

5. The slot machine of claim 1, wherein the bonus-triggering outcome is the combination of predetermined bonus-trigger symbols appearing in the base-game outcome, and the purchased at least one bonus-triggering-enhancement parameter is the wild-symbol-bonus-triggering enhancement.

6. The slot machine of claim 1, wherein the bonus-triggering outcome is a combination of predetermined bonus-trigger symbols appearing on an active payline in the base-game outcome, and the purchased at least one bonus-triggering-enhancement parameter is the nudge-to-trigger bonus-triggering enhancement which automatically shifts one or more symbols in the base-game outcome to thereby align on the active payline a previously misaligned one of the predetermined bonus-trigger symbols required for the bonus-triggering outcome.

7. The slot machine of claim 1, wherein each of the available bonus-triggering-enhancement parameters has associated therewith a distinct purchase price, the second wager corresponding to at least one of the distinct purchase prices.

8. The slot machine of claim 1, wherein the option of submitting the second wager provides the player an opportunity to purchase more than one of the bonus-triggering-enhancement parameters.

9. The slot machine of claim 1, wherein the display device only displays one of the bonus-triggering-enhancement parameters, and the option of submitting the second wager provides the player an opportunity to purchase only the one displayed bonus-triggering-enhancement parameter.

10. The slot machine of claim 1, wherein the second wager does not affect any awards associated with the randomly selected outcome of the base game.

11. The slot machine of claim 1, wherein the display device is further configured to display a pop-up window, the pop-up window providing the option of submitting the second wager to purchase the at least one bonus-triggering-enhancement parameter.

12. A method of conducting a wagering game on a gaming system, the gaming system including an electronic slot machine with one or more electronic input devices configured to receive physical inputs from players and transform the physical inputs into electronic data signals, and one or more electronic display devices configured to display outcomes of the wagering game, the gaming system also including one or more electronic random element generators configured to generate random elements associated with play of the wagering game, and one or more controllers, the wagering game including a base game and a bonus game, the bonus game having an initial probability of being triggered during play of the base game, the method comprising:

receiving, via at least one of the one or more electronic input devices, a first physical input from a player as an indication of a first wager to play the wagering game;

initiating, via at least one of the one or more controllers, the base game of the wagering game in response to an electronic data signal generated by the at least one electronic input device responsive to the first physical input from the player;

displaying, via at least one of the one or more electronic display devices, one or more available bonus-triggering-enhancement parameters each configured to increase the initial probability of triggering the bonus game to a higher probability of triggering the bonus game during play of the base game;

receiving, via at least one of the one or more electronic input devices, a second physical input from the player as an indication of a second wager, distinct from the first wager, to purchase at least one of the one or more bonus-triggering-enhancement parameters during a play of the base game, the purchased at least one bonus-triggering-enhancement parameter including a reduced-symbol-requirement bonus-triggering enhancement, a mystery-bonus-triggering enhancement, a scatter-symbol-bonus-triggering enhancement, a wild-symbol-bonus-triggering enhancement, or a nudge-to-trigger bonus-triggering enhancement, or any combination thereof;

enabling, via at least one of the one or more controllers, the purchased at least one bonus-triggering-enhancement parameter in response to the second wager;

randomly selecting, via at least one of the one or more controllers based, at least in part, on one or more random elements generated by at least one of the one or more electronic random element generators, a base-game outcome from a plurality of available base-game outcomes in response to the first wager, the plurality of base-game outcomes including a bonus-triggering outcome; and displaying, via at least one of the one or more input devices, the randomly selected base-game outcome, wherein the scatter-symbol-bonus-triggering enhancement modifies the bonus-triggering outcome to include a combination of bonus-trigger symbols appearing anywhere in the base-game outcome, and wherein the wild-symbol-bonus-triggering enhancement modifies an existing wild symbol appearing in the base-game outcome to also substitute for a bonus-trigger symbol required for the bonus-triggering outcome.

13. The method of claim 12, wherein the bonus-triggering outcome is a combination of N predetermined symbols appearing in the base-game outcome, and the purchased at least one bonus-triggering-enhancement parameter is the reduced-symbol-requirement bonus-triggering enhancement which reduces the bonus-triggering outcome from N predetermined symbols to N−1 or less predetermined symbols appearing in the base-game outcome.

14. The method of claim 12, wherein the purchased at least one bonus-triggering-enhancement parameter is the mystery-bonus-triggering enhancement which is an invisible mystery trigger configured to trigger the bonus game independent of symbols displayed in the outcome of the base game.

15. The method of claim 12, wherein the bonus-triggering outcome is the combination of predetermined bonus-trigger symbols appearing on an active payline in the base-game outcome, and the purchased at least one bonus-triggering-enhancement parameter is the scatter-symbol-bonus-triggering enhancement.

16. The method of claim 12, wherein the bonus-triggering outcome is the combination of predetermined bonus-trigger symbols appearing in the base-game outcome, and the purchased at least one bonus-triggering-enhancement parameter is the wild-symbol-bonus-triggering enhancement.

17. The method of claim 12, wherein the bonus-triggering outcome is a combination of predetermined symbols appearing on an active payline in the base-game outcome, and the purchased at least one bonus-triggering-enhancement parameter is the nudge-to-trigger bonus-triggering enhancement which automatically shifts one or more symbols in the base-game outcome to thereby align on the active payline a previously misaligned one of the predetermined symbols required for the bonus-triggering outcome.

18. The method of claim 12, wherein each of the available bonus-triggering-enhancement parameters has associated therewith a distinct purchase price, the second wager corresponding to at least one of the distinct purchase prices.

19. The method of claim 12, wherein the at least one of the one or more display devices only displays one of the bonus-triggering-enhancement parameters, and the option of submitting the second wager provides the player an opportunity to purchase only the one displayed bonus-triggering-enhancement parameter.

20. A gaming system primarily dedicated to conducting one or more casino wagering games, the gaming system comprising:

a slot machine with a cabinet, one or more electronic input devices configured to receive one or more physical inputs from players and transform the one or more physical inputs into one or more electronic data signals, and one or more electronic video display devices operable to display aspects and randomly determined outcomes of a wagering game;

one or more processors with one or more electronic random element generators configured to generate one or more random elements associated with play of the wagering game; and one or more memory devices storing instructions which, when executed by at least one of the one or more processors, cause the gaming system to:

receive, via at least one of the one or more electronic input devices, a first physical input from a player indicative of a first wager to initiate the wagering game, the wagering game including a base-game portion and a bonus-game portion, the base-game portion including a plurality of symbol-bearing reels;

display, via at least one of the one or more electronic video display devices, one or more available bonus-triggering-enhancement parameters each configured to increase an initial probability of triggering the bonus-game portion to a higher probability of triggering the bonus-game portion during play of the base-game portion;

receive, via at least one of the one or more electronic input devices, a second physical input from a player indicative of a second wager, distinct from the first wager, to enable at least one of the one or more available bonus-triggering-enhancement parameters during a play of the base-game portion, the purchased at least one bonus-triggering-enhancement parameter consisting of a reduced-symbol-requirement bonus-triggering enhancement, a mystery-bonus-triggering enhancement, or a nudge-to-trigger bonus-triggering enhancement, or any combination thereof;

enable, via at least one of the one or more processors, the purchased at least one bonus-triggering-enhancement parameter in response to the second wager;

initiate, via at least one of the one or more processors, the wagering game in response to an electronic data signal generated by the at least one of the electronic input devices responsive to the first physical input from the player;

determine an outcome of the base-game portion of the wagering game based, at least in part, on one or more random elements generated by at least one of the one or more random element generators;

display, via at least one of the one or more electronic video display devices, the symbol-bearing reels spinning and stopping to reveal the randomly determined outcome of the base-game portion of the wagering game; and transmit an indication of an award to player in response to the outcome of the base-game portion meeting at least one predetermined award criterion.

* * * * *